(12) United States Patent
Ooba et al.

(10) Patent No.: US 10,099,428 B2
(45) Date of Patent: Oct. 16, 2018

(54) THREE-DIMENSIONAL FABRICATING APPARATUS AND METHOD OF FABRICATE THREE-DIMENSIONAL SHAPED OBJECT

(71) Applicant: CMET INC., Kanagawa-ken (JP)

(72) Inventors: Yoshikazu Ooba, Kanagawa-ken (JP);
Koukichi Suzuki, Kanagawa-ken (JP);
Yuuya Daicho, Kanagawa-ken (JP)

(73) Assignee: CMET INC., Kanagawa (JP)

( * ) Notice: Subject to any disclaimer, the term of this patent is extended or adjusted under 35 U.S.C. 154(b) by 188 days.

(21) Appl. No.: 14/980,806

(22) Filed: Dec. 28, 2015

(65) Prior Publication Data

US 2016/0107387 A1    Apr. 21, 2016

Related U.S. Application Data

(63) Continuation of application No. PCT/JP2014/067223, filed on Jun. 27, 2014.

(30) Foreign Application Priority Data

Jun. 28, 2013 (JP) ................................ 2013-137492

(51) Int. Cl.
*B29C 64/165* (2017.01)
*B33Y 10/00* (2015.01)
(Continued)

(52) U.S. Cl.
CPC ........ *B29C 67/0081* (2013.01); *B29C 64/165* (2017.08); *B33Y 10/00* (2014.12); *B33Y 30/00* (2014.12)

(58) Field of Classification Search
CPC .................................................. B29C 64/165
See application file for complete search history.

(56) References Cited

U.S. PATENT DOCUMENTS

| 2001/0050448 | A1 | 12/2001 | Kubo et al. |
| 2010/0323050 | A1 | 12/2010 | Kumagai et al. |
| 2016/0318251 | A1* | 11/2016 | Ederer ................ B29C 67/0081 |

FOREIGN PATENT DOCUMENTS

| JP | H06-218712 | 8/1994 |
| JP | H07-507508 | 8/1995 |

(Continued)

OTHER PUBLICATIONS

Extended European Search Report EP Application No. 1417879.1 dated Mar. 22, 2017.

(Continued)

*Primary Examiner* — Mary Lynn F Theisen
(74) *Attorney, Agent, or Firm* — Pillsbury Winthrop Shaw Pittman, LLP

(57) ABSTRACT

A three-dimensional fabricating apparatus has a table on which a powder material is stacked in a layered manner, and a shaping unit which includes a powder material supply device supplying the powder material onto a top surface of the table by every predetermined layer thickness and a binder liquid supply device ejecting a binder liquid to the powder material supplied onto the top surface of the table. The powder material supply device of the shaping unit is movable in one direction in a state adjacent to the top surface of the table and is capable of supplying the powder material onto the top surface of the table at a predetermined supply width while moving the powder material supply device. The binder liquid supply device is capable of moving in the same direction as the powder material supply device in a state adjacent to the top surface of the table.

7 Claims, 20 Drawing Sheets

(51) Int. Cl.
   *B33Y 30/00*   (2015.01)
   *B29C 67/00*   (2017.01)

(56)         References Cited

FOREIGN PATENT DOCUMENTS

| JP | 2001-334581 A | 12/2001 |
| JP | 2005-015332 A | 1/2005 |
| JP | 2009-012413 A | 1/2009 |
| JP | 2010-221480 A | 10/2010 |
| WO | WO 93/25336 | 12/1993 |

OTHER PUBLICATIONS

International Search Report as issued in International Patent Application No. PCT/JP2014/067223, dated Sep. 30, 2014.

* cited by examiner

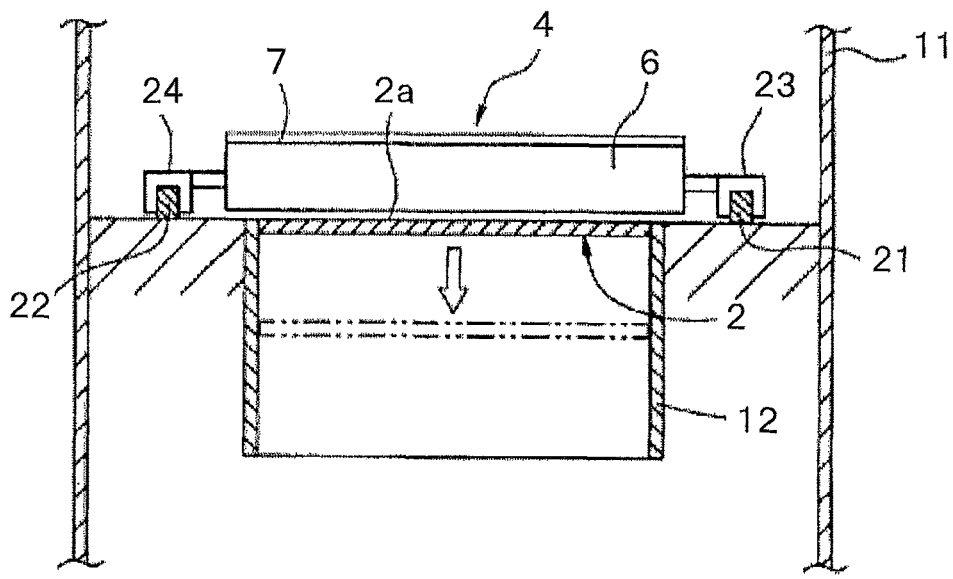
F I G. 2
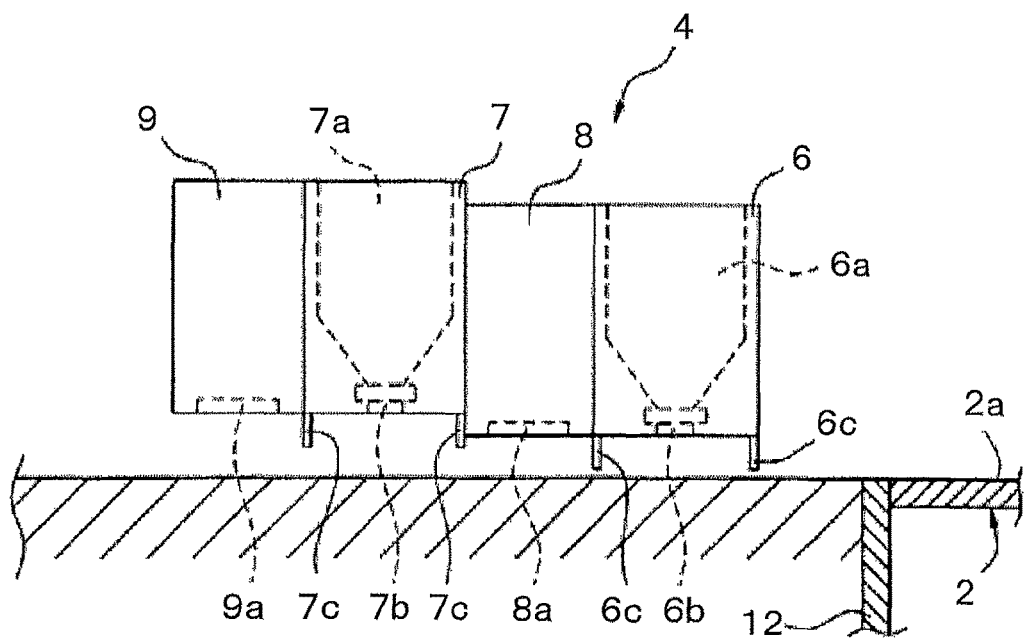
F I G. 3

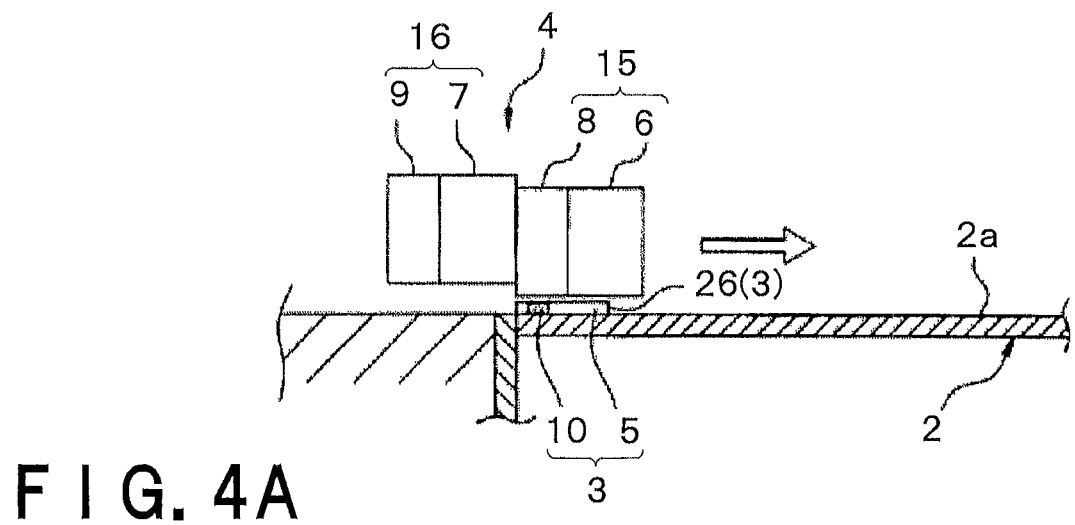
F I G. 4A
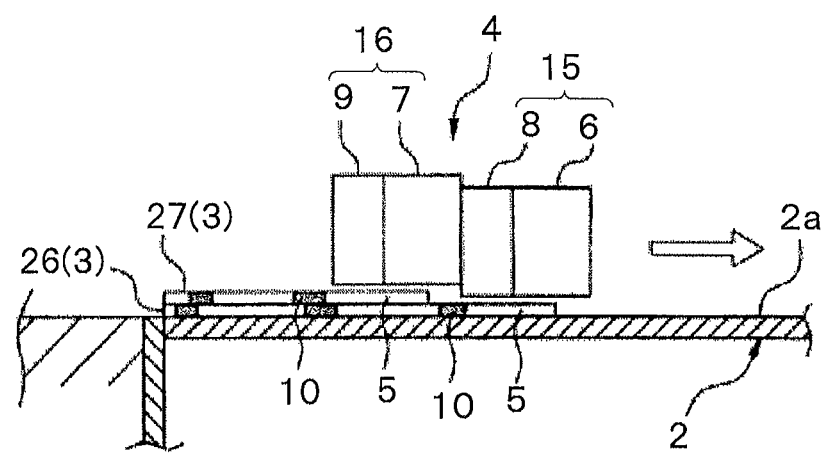
F I G. 4B
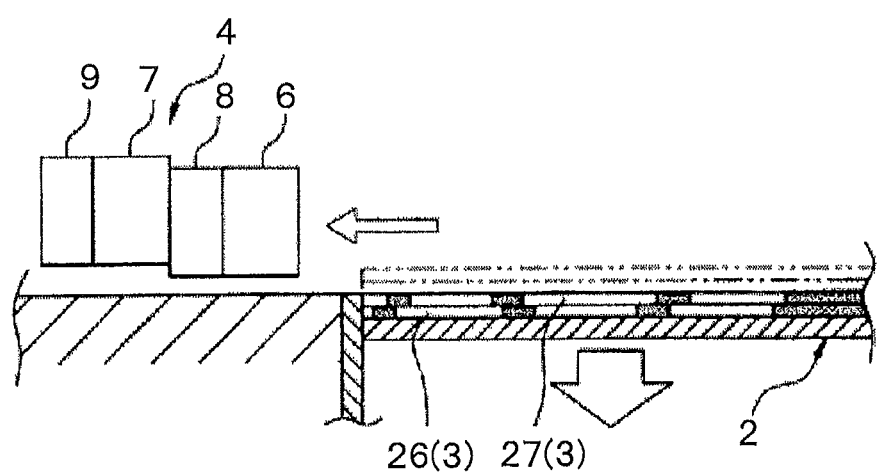
F I G. 4C

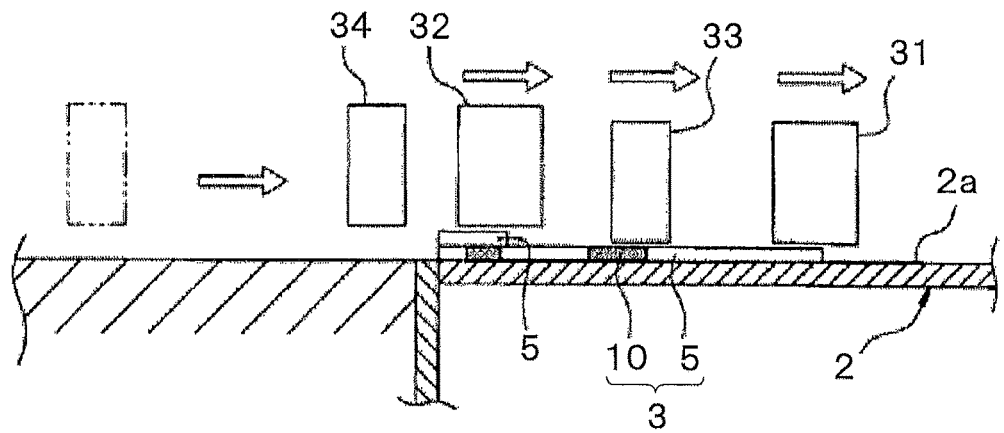
F I G. 7A
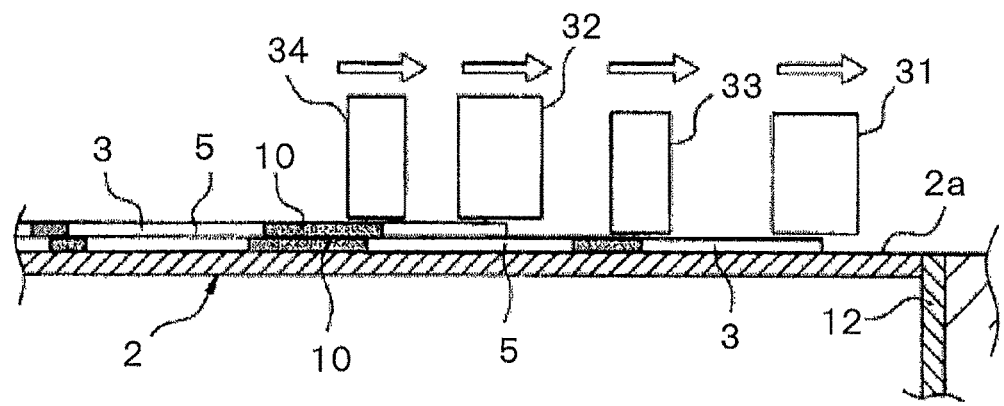
F I G. 7B
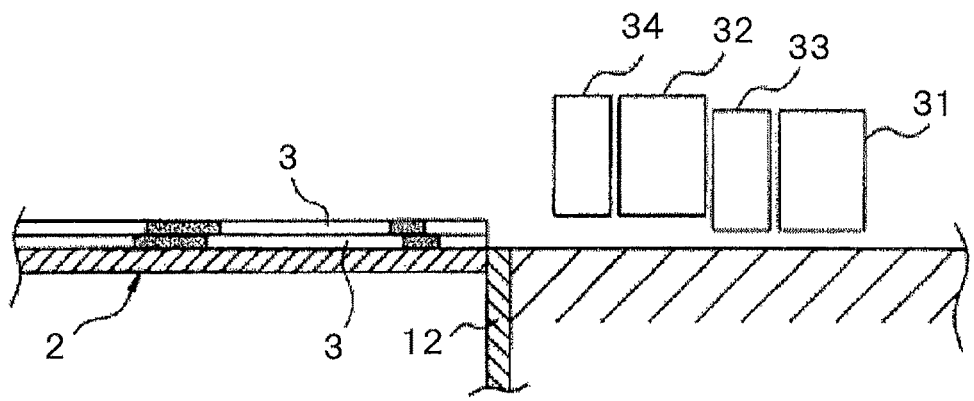
F I G. 7C

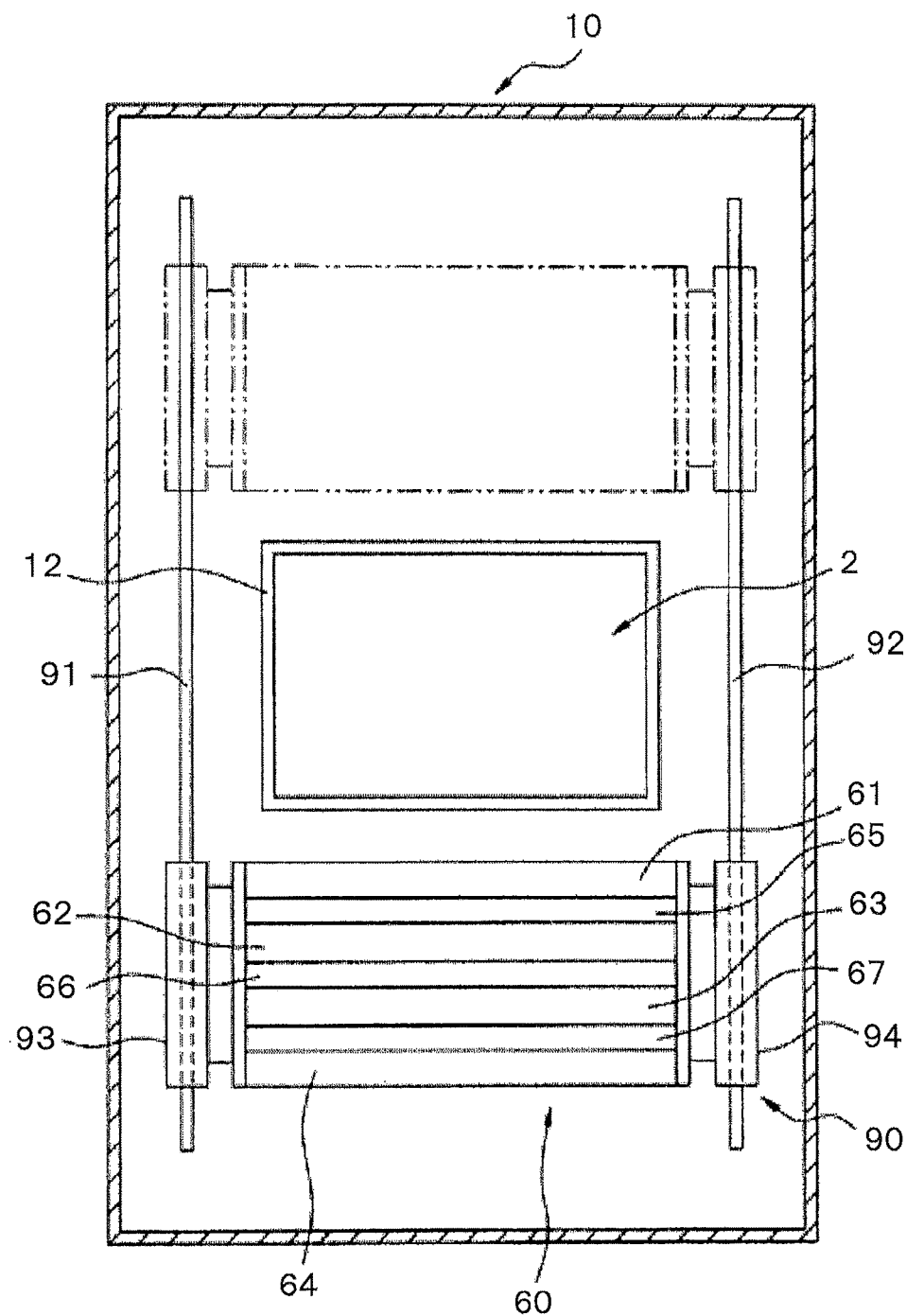
F I G. 8

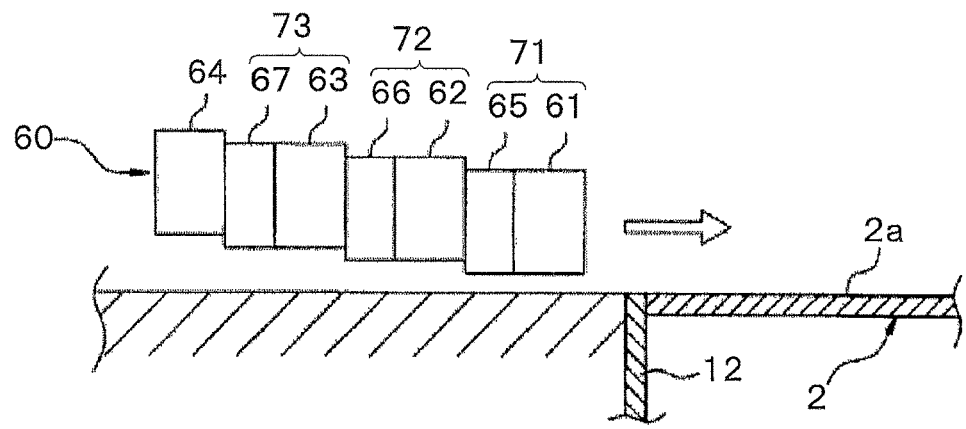
F I G. 10A
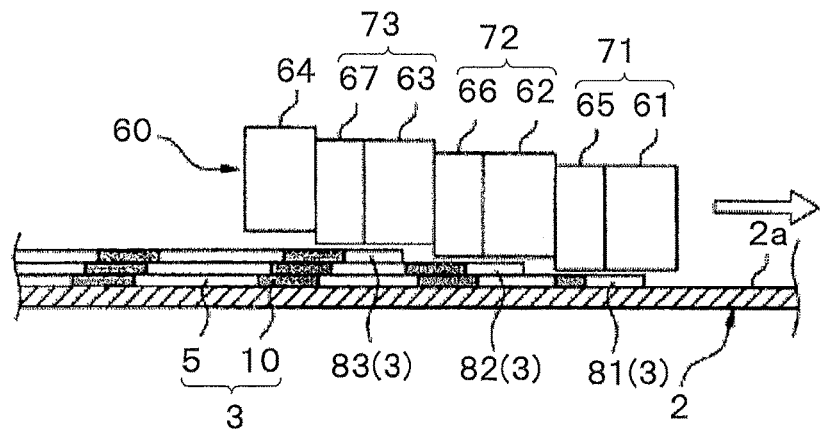
F I G. 10B
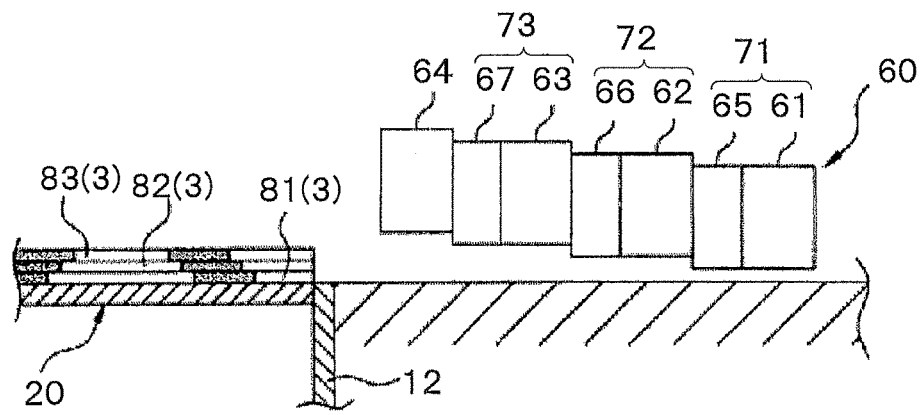
F I G. 10C

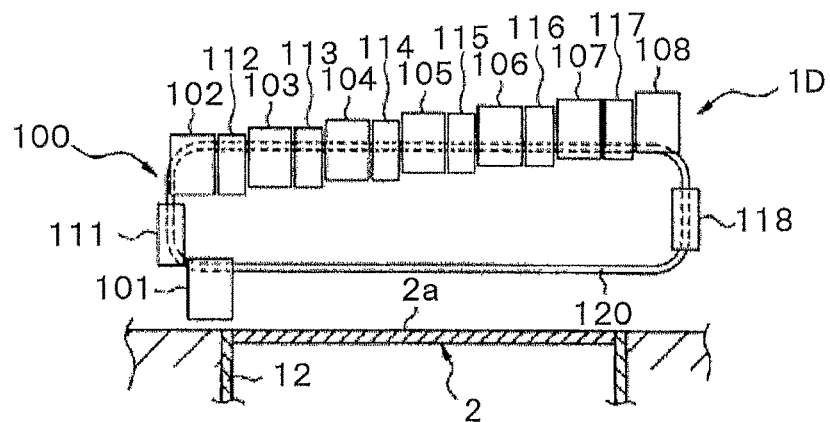
F I G. 12A
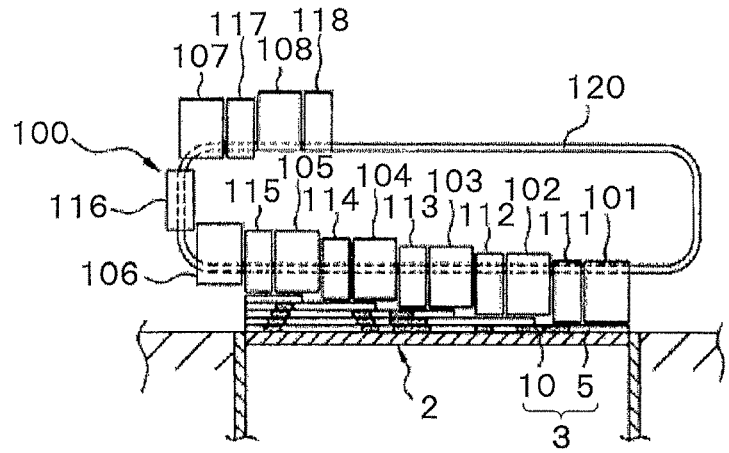
F I G. 12B
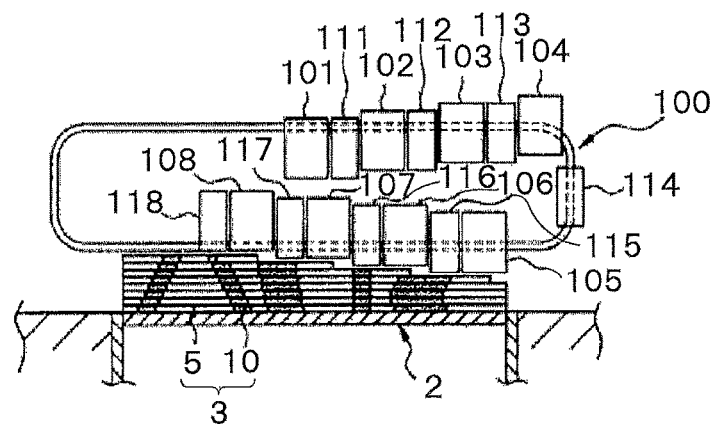
F I G. 12C

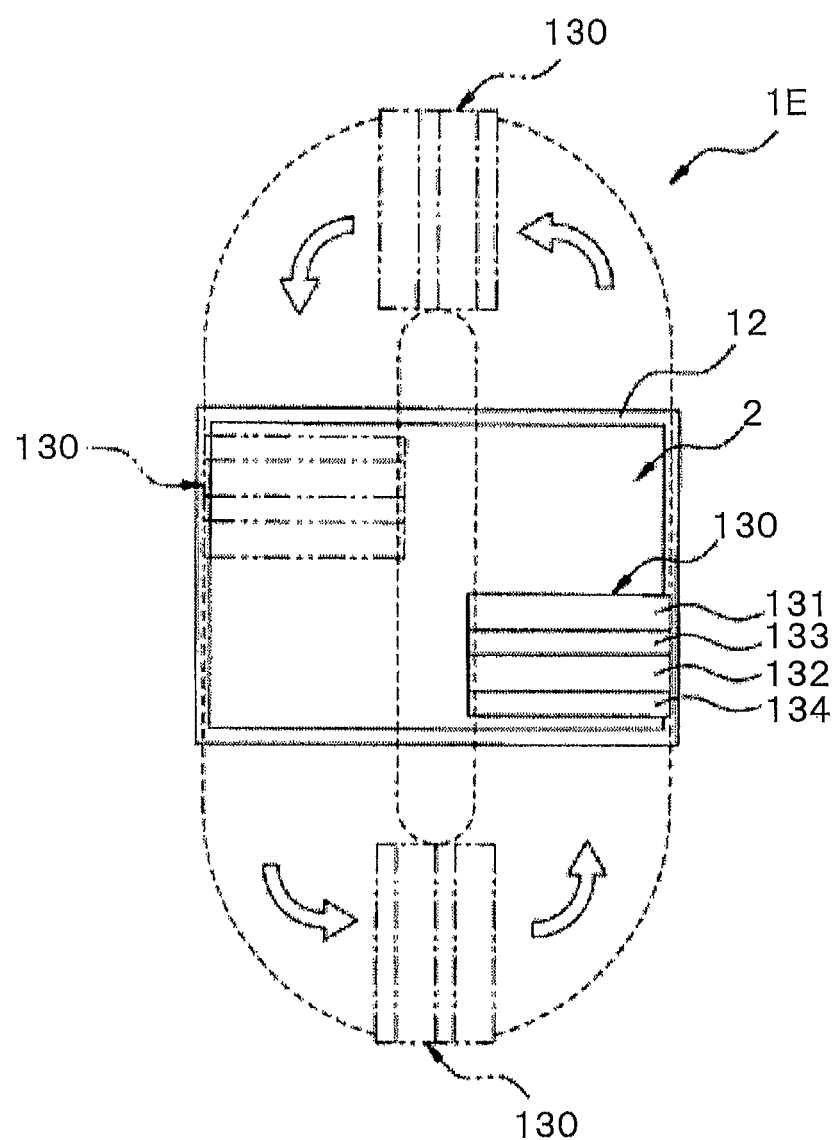
F I G. 13

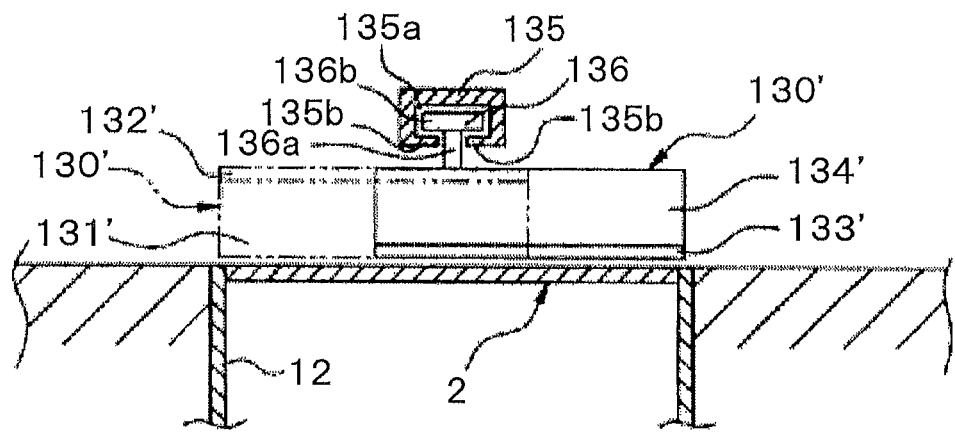
F I G. 16
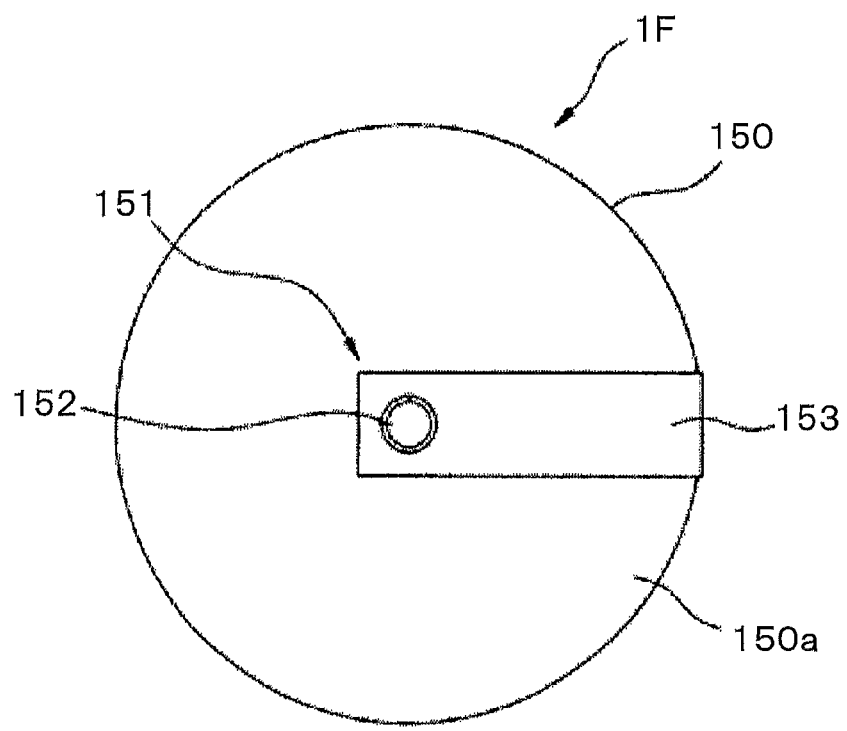
F I G. 17

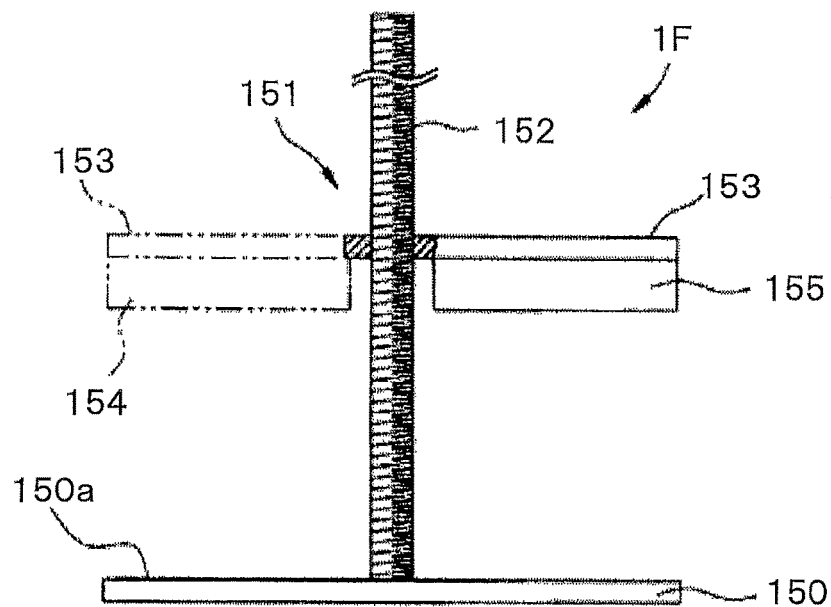
F I G. 18
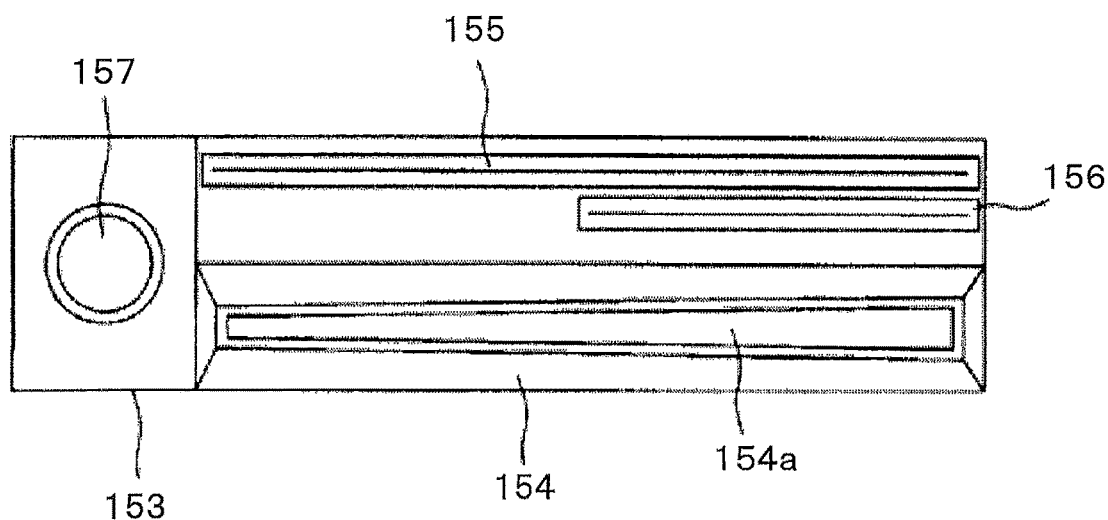
F I G. 19

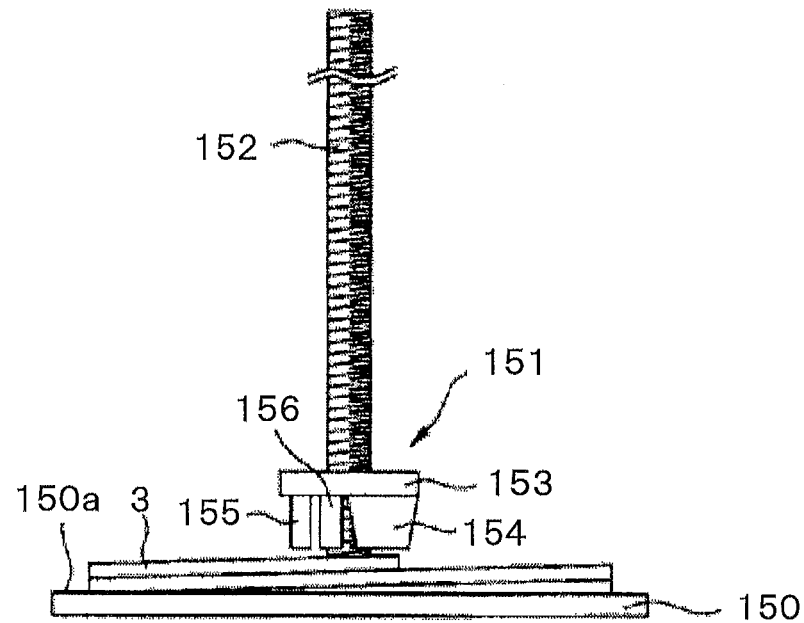
F I G. 20
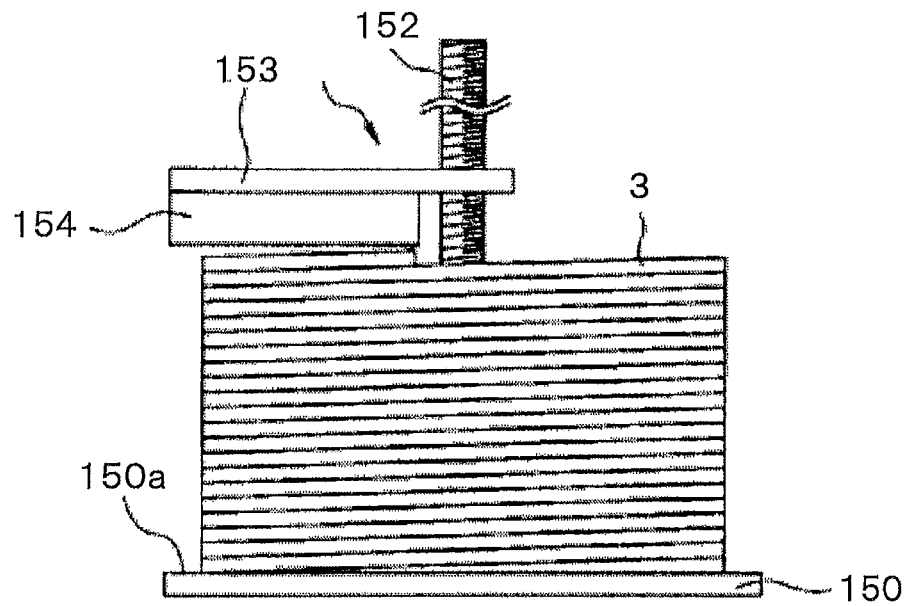
F I G. 21

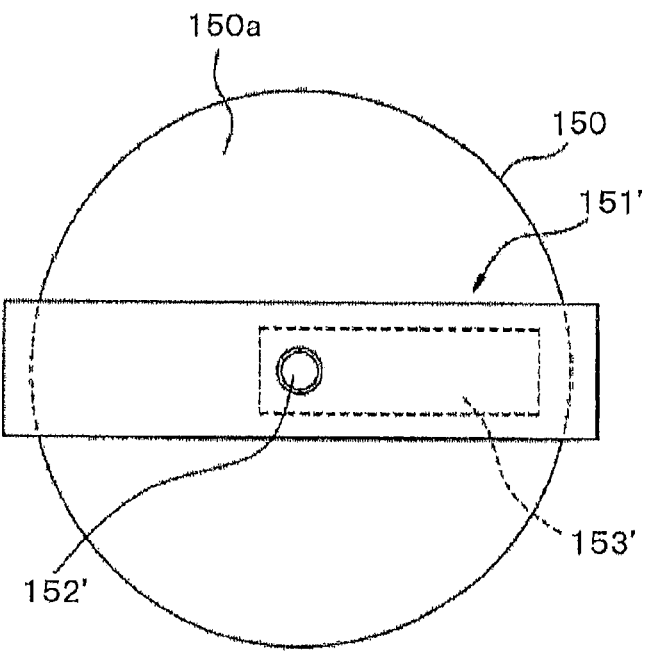
F I G. 24
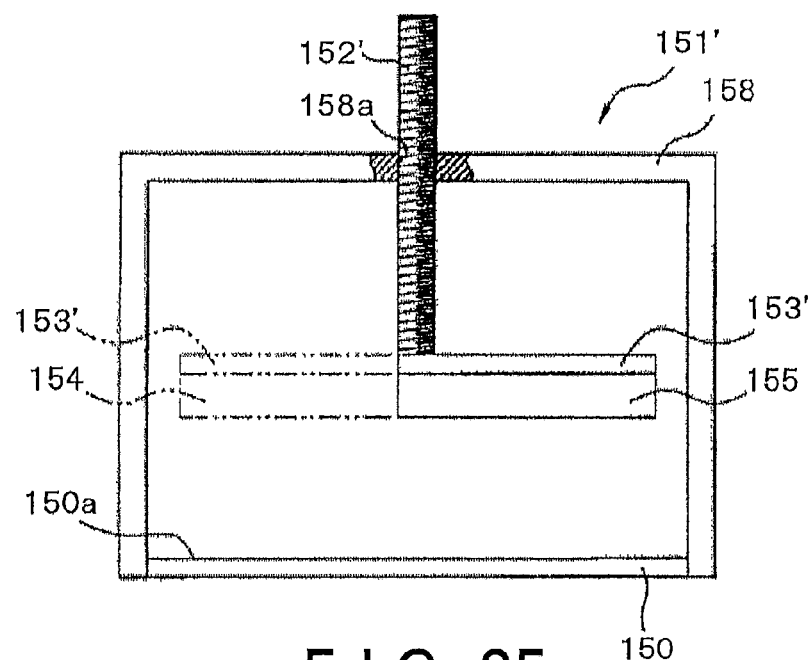
F I G. 25

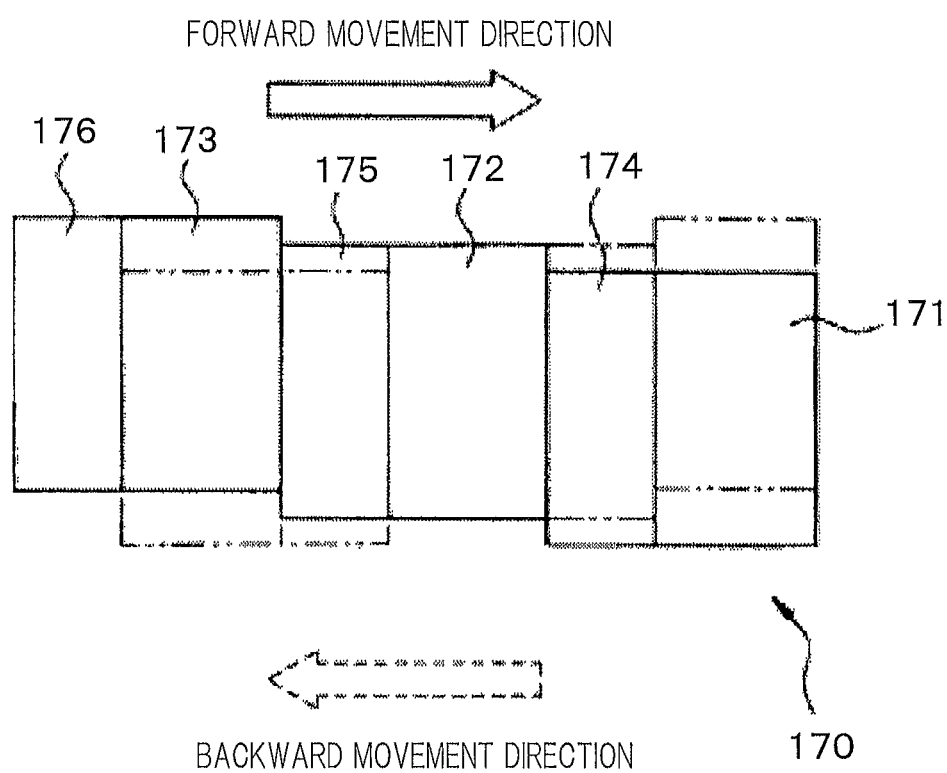
F I G. 26

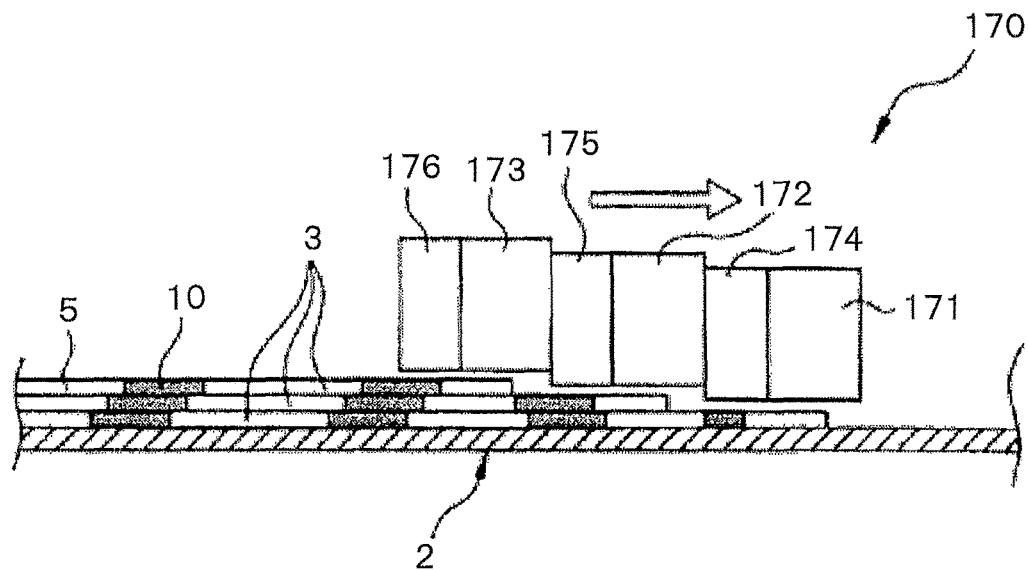
F I G. 27A
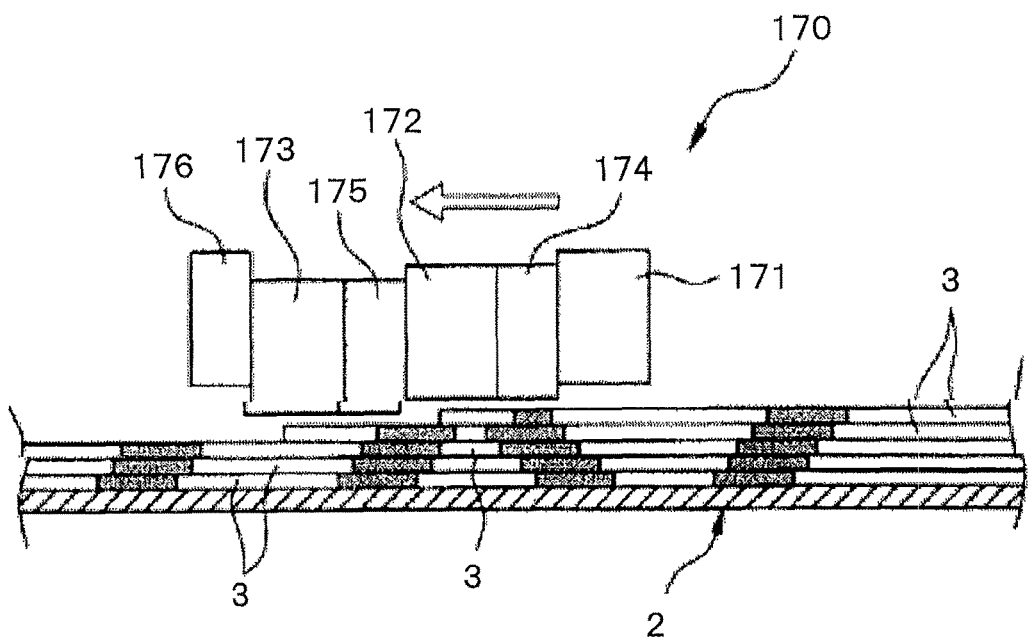
F I G. 27B

THREE-DIMENSIONAL FABRICATING APPARATUS AND METHOD OF FABRICATE THREE-DIMENSIONAL SHAPED OBJECT

CROSS-REFERENCE TO RELATED APPLICATIONS

This application is based upon and claims the benefit of priority from Japanese Patent Application No. 2013-137492 filed on Jun. 28, 2013 and PCT Application No. PCT/JP2014/067223 filed on Jun. 27, 2014, the entire contents of which are incorporated herein by reference.

TECHNICAL FIELD

The present invention relates to a three-dimensional fabricating apparatus and a method of fabricating a three-dimensional shaped object of fabricating the three-dimensional shaped object which shape the three-dimensional shaped object as a shaping target by stacking a plurality of powder material layers each of which is formed by ejecting a binder liquid to a layered powder material so as to bind the powder material.

BACKGROUND ART

Hitherto, a technique called rapid prototyping is widely known. Here, a three-dimensional shaped object as a shaping target is shaped by stacking layers each having a cross-sectional shape as a horizontal cross-section.

As the rapid prototyping, there are known various techniques such as a stereolithography of irradiating a laser to plastic resin, a laminated object manufacturing of stacking thin film sheets by bonding the sheets, a type of extruding and stacking photocuring resins, and a powder shaping type of binding a powder material by a binder liquid.

Among these, as the technique of the powder shaping type is comparatively easy in treatment, compared to the other techniques and thus it is possible to make the shaped object of the powder shaping type at low cost.

As the fabricating method using a powder, for example, as illustrated in JP H6-218712 A (Patent Literature 1) and JP H7-507508 A (Patent Literature 2), a powder material is supplied onto a top surface of a table at a predetermined layer thickness in a layered manner, a binder liquid is ejected from an inkjet head and the like to the layer so as to form layers of a part of a shaped object, and the layers are sequentially stacked so as to shape a three-dimensional shaped object.

In a three-dimensional fabricating apparatus that shapes an object by a powder, generally, a powder material is supplied from a powder material supply device to a top surface of a table and a binder liquid is ejected from a binder liquid supply device to the powder material supplied onto the top surface of the table.

When the shaped object is formed by the three-dimensional fabricating apparatus with such a configuration, generally the following operations are repeated until the shaped object is completed.

That is, the powder material supply device is moved linearly so as to uniformly spread the powder material on the top surface of the table at a predetermined layer thickness, and then the powder material supply device is separated from the top surface of the table so as to be returned to an origin position.

Next, the binder liquid supply device is moved so as to eject the binder liquid toward the powder material on the top surface of the table, and hence a powder material layer including layers of a part of the shaped object are formed.

Then, after the ejection of the binder liquid is completed, the binder liquid supply device is separated from the top surface of the table so as to return to the origin position, and the powder material supply device is moved so as to supply a new powder material onto the top surface of the table, more specifically, on the powder material layer formed immediately before. Accordingly, the next powder material layer is uniformly formed by spreading at a predetermined layer thickness.

However, if the powder material supply device or the binder liquid supply device is returned to the origin position when the operation of supplying the powder material from the powder material supply device and the operation of ejecting the binder liquid from the binder liquid supply device are switched, a problem arises in that some time is taken for the movement.

In general, in the rapid prototyping including the powder shaping type of forming the shaped object, there is a tendency that some time is taken until the shaped object is completed, because the powder material layer having a small layer thickness is stacked. Of course, the time required for making the shaped object depends on the size of the three-dimensional shaped object. For that reason, it is desirable to shorten the shaping time by fabricating the shaped object at a high speed. However, the moving time of the powder material supply device or the binder liquid supply device is a factor that further increases the shaping time until the shaped object is completed.

CITATION LIST

Patent Literature

Patent Literature 1: JP H6-218712 A
Patent Literature 2: JP H7-507508 W

SUMMARY OF INVENTION

Technical Problem

A technical feature of the invention is to provide a technique capable of forming and stacking a powder material layer in a short time as possible by efficiently supplying a powder material onto a top surface of a table and ejecting a binder liquid to the powder material supplied onto the top surface of the table when manufacturing a three-dimensional shaped object by a powder material.

Solution to Problem

In order to solve the above issue, a three-dimensional fabricating apparatus of the present invention includes: a table on which a powder material is stacked in a layered manner; and a shaping unit which includes a powder material supply device supplying the powder material onto a top surface of the table by every predetermined layer thickness and a binder liquid supply device ejecting a binder liquid to the powder material supplied onto the top surface of the table so as to bind the powder material, wherein the powder material supply device of the shaping unit is movable in one direction in a state adjacent to the top surface of the table and is capable of supplying the powder material onto the top surface of the table at a predetermined supply width while moving the powder material supply device, and the binder liquid supply device is capable of moving in the same direction as the powder material supply device in a state adjacent to the top surface of the table, is capable of ejecting the binder liquid to the top surface of the table at the same ejection width as the powder material supply width of the powder material supply device in maximum, and is capable of moving and ejecting the binder liquid to the powder material supplied onto the top surface of the table in accordance with the movement of the powder material supply device.

In the present invention, it is desirable that the binder liquid supply device include an inkjet head which extends horizontally in a direction intersecting the movement direction of the binder liquid supply device and ejects the binder liquid toward the powder material supplied onto the top surface of the table.

In the present invention, the shaping unit can have a configuration in which a plurality of the powder material supply devices and a plurality of the binder liquid supply devices are alternately and linearly disposed in the movement direction, one group includes the powder material supply device located at the front side in the movement direction and the binder liquid supply device located adjacently subsequently after the powder material supply device located at the front side, and when the powder material supply device of each group ejects the powder material onto the top surface of the table, the binder liquid supply device of the same group can eject the binder liquid to the powder material so as to form a powder material layer on the top surface of the table, and a powder material layer can be formed by the group of the binder liquid supply device and the powder material supply device located at the front side of the movement direction, and a new powder material layer formed by the group of the binder liquid supply device and the powder material supply device located adjacently and subsequently after the group is sequentially stacked on the powder material layer.

In this case, the shaping unit can have a configuration in which the powder material supply device is located at the foremost side in the forward movement direction and the binder liquid supply device is located at the rearmost position in a predetermined movement direction, and the powder material layer can be formed only when the shaping unit moves in the predetermined movement direction.

Further, in one group having the powder material supply device and the binder liquid supply device of the shaping unit, the powder material supply position and the binder liquid ejection position of the group of the powder material supply device and the binder liquid supply device located at the foremost position of the movement direction are lowest, and the subsequent groups of the powder material supply device and the binder liquid supply device can be set so that the powder material supply position and the binder liquid ejection position increase in height by one layer thickness of the powder material layer as approaching the rearmost position in the movement direction.

Further, in the present invention, the powder material supply device and the binder liquid supply device of the shaping unit can be adapted to be movable so as to rotate in the circumferential direction in a rounded rectangular shape in the top view, and the powder material layer can be formed during the circumferential rotation of the powder material supply device and the binder liquid supply device.

Alternatively, the powder material supply device and the binder liquid supply device of the shaping unit can move in series in a state adjacent to the top surface of the table when the powder material layer is formed, and the powder material supply device and the binder liquid supply device respectively ending the supply of the powder material and the ejection of the binder liquid with respect to one powder material layer to be formed can be separated from the top surface of the table from the adjacent state so as to sequentially return to an origin position.

Alternatively, in the present invention, the powder material supply devices and the binder liquid supply devices of the shaping units can be all movable linearly in a reciprocating manner, and when the powder material supply devices and the binder liquid supply devices repeatedly move in a reciprocating manner, the powder material layer can be stacked.

In this case, it is desirable that the powder material supply device and the binder liquid supply device of the shaping unit be capable of moving upward and downward in the vertical direction, and the powder material supply devices and the binder liquid supply devices move upward and downward in response to the movement direction so that the powder material supply position and the binder liquid ejection position of the group of the powder material supply device and the binder liquid supply device located at the foremost position in the movement direction are lowest, the supply positions and the binder liquid ejection positions of the subsequent groups of the powder material supply device and the binder liquid supply device increase in height by one layer thickness of the powder material layer as it goes toward the rearmost position in the movement direction, and the position of the powder material supply device located at the rearmost position is highest.

Further, the shaping unit can have a configuration in which the powder material supply device is located in at least one end side in the arrangement direction of the powder material supply device and the binder liquid supply device, and when the powder material supply device at the end side is located at the rearmost position in the movement direction, the powder material supply device at the end side can be moved without supplying the powder material to the top surface of the table.

Alternatively, the shaping unit can have a configuration in which the binder liquid supply device is located in at least one end side in the arrangement direction of the powder material supply device and the binder liquid supply device, and when the binder liquid supply device at the end side is located at the foremost position in the movement direction, the binder liquid supply device at the end side can be moved without any ejection of the binder liquid.

Alternatively, in the present invention, the shaping unit can include a rotation member that is rotatable about the axis of a shaft member extending in the vertical direction, the rotation member can be provided with the powder material supply device and the binder liquid supply device, and when the powder material supply device and the binder liquid supply device rotate about the axis of the shaft member along with the rotation member, the powder material layer can be formed on the top surface of the table.

In this case, the lower end side of the shaft member can be fixed to the top surface of the table, and when the rotation member rotates about the axis of the shaft member in one direction, the rotation member can rotate along with the powder material supply device and the binder liquid supply device.

Alternatively, the rotation member may be fixed to the lower end side of the shaft member, and the rotation member gradually and synchronously may move upward while rotating along with the rotation of the shaft member.

Further, in the present invention, it is desirable that the rotation member be capable of gradually moving upward while rotating about the axis of the shaft member, and when the rotation member continuously rotates, the powder material layer be stacked while the powder material supply device and the binder liquid supply device continuously form the powder material layer.

Meanwhile, in order to solve the above issue, provided is a three-dimensional shaped object fabricating method of the present invention of fabricating a shaped object while stacking a powder material layer by sequentially repeating a step of supplying a powder material from a powder material supply device onto a top surface of a table which is used to stack the powder material in a layered manner at a predetermined layer thickness and a step of ejecting a binder liquid from a binder liquid supply device to the powder material supplied onto the top surface of the table so that the powder material is bound and layers of a part of a three-dimensional shaped object of a shaping target are formed, wherein the powder material supply device is moved in one direction while being adjacent to the top surface of the table so that the powder material is supplied onto the top surface of the table at a predetermined supply width, and the powder material layer is formed in a manner such that the binder liquid supply device is moved in the same direction as the powder material supply device in a state adjacent to the top surface of the table so as to follow the movement of the powder material supply device and the binder liquid is ejected to the powder material supplied onto the top surface of the table at the same ejection width as the powder material supply width of the powder material supply device in maximum.

In this case, it is desirable that the plurality of powder material supply devices and the plurality of binder liquid supply devices be alternately and linearly disposed in the movement direction, and one group includes the powder material supply device located at the front side in the movement direction and the binder liquid supply device located adjacently subsequently after the powder material supply device located at the front side, and when the powder material supply device of each group supplies the powder material onto the top surface of the table, the binder liquid supply device of the same group ejects the binder liquid to the powder material so as to form the powder material layer on the top surface of the table, and the group of the powder material supply device and the binder liquid supply device located adjacently and subsequently after the group supplies the powder material and eject the binder liquid onto the powder material layer formed by the group of the powder material supply device and the binder liquid supply device located at the front side in the movement direction so as to form a new powder material layer thereon.

Further, the powder material supply device may be capable of moving upward and downward in the vertical direction as the movement direction, the powder material supply devices and the binder liquid supply devices may be respectively moved upward and downward so that the powder material supply position and the binder liquid ejection position of the group of the powder material supply device and the binder liquid supply device located at the foremost position in the movement direction are lowest, the supply positions and the binder liquid ejection positions of the subsequent groups of the powder material supply device and the binder liquid supply device increase in height by one layer thickness of the powder material layer as approaching the rearmost position in the movement direction, and the position of the powder material supply device located at the rearmost position is highest in response to the movement direction, and the powder material layers may be sequentially formed and stacked by the reciprocating movement of the powder material supply devices and the binder liquid supply devices.

Alternatively, when the powder material supply device and the binder liquid supply device provided in the rotation member being rotatable about the axis of the shaft member extending in the vertical direction rotate about the axis of the shaft member along with the rotation member, the powder material layer can be formed on the top surface of the table.

In this case, when the rotation member continuously rotates about the axis of the shaft member and gradually moves upward along with the powder material supply device and the binder liquid supply device, the powder material supply device and the binder liquid supply device can continuously stack the powder material layer while continuously forming the powder material layer.

Further, in the fabricating method of the present invention, when the powder material is supplied from the powder material supply device at a predetermined layer thickness onto the top surface of the table, an additive can be mixed with the powder material before the powder material is supplied onto the top surface of the table.

Advantageous Effects of Invention

According to the invention, the binder liquid supply device ejecting the binder liquid is moved in the same direction as the powder material supply device so as to follow the movement of the powder material supply device supplying the powder material onto the top surface of the table, and the binder liquid is ejected onto the powder material supplied onto the top surface of the table. Thus, the ejection of the binder liquid can be performed with a slight time difference from the supply of the powder material onto the top surface of the table. For that reason, the supply of the powder material and the ejection of the binder liquid can be highly efficiently performed compared to the case where the powder material supply device or the binder liquid supply device is returned to the origin position when the operation of supplying the powder material from the powder material supply device and the operation of ejecting the binder liquid from the binder liquid supply device are switched as in the related art.

As a result, since it is possible to highly efficiently form and stack the powder material layer in a short time, it is possible to remarkably shorten a time required for making the three-dimensional shaped object.

BRIEF DESCRIPTION OF DRAWINGS

FIG. 2 is a longitudinal sectional view illustrating the three-dimensional fabricating apparatus when viewed from the rear side thereof.

FIG. 3 is a main enlarged side view schematically illustrating a shaping unit of the three-dimensional fabricating apparatus according to the first embodiment of the invention, where a movement member is omitted.

FIGS. 4A to 4C are explanatory diagrams illustrating a method of forming a three-dimensional shaped object in the three-dimensional fabricating apparatus according to the first embodiment of the invention, where FIG. 4A illustrates a state immediately after a shaping operation for a three-dimensional shaped object starts, FIG. 4B illustrates a state where a powder material layer is formed, and FIG. 4C illustrates a state where the shaping unit returns to an origin position.

FIG. 6A illustrates a state before a shaping operation for a three-dimensional shaped object starts, FIG. 6B illustrates a state where a first group including a powder material supply device and a binder liquid supply device starts to form a powder material layer, and FIG. 6C illustrates a state where the powder material layer is formed from the state of FIG. 6B.

FIGS. 7A to 7C are explanatory diagrams illustrating a part of a method of forming a three-dimensional shaped object in a state where the three-dimensional shaped object is further shaped from the state of FIGS. 6A to 6C, where FIG. 7A illustrates a state where a second group including a powder material supply device and a binder liquid supply device starts to form a powder material layer, FIG. 7B illustrates a state where the powder material layer is formed form the state of FIG. 7A, and FIG. 7C illustrates a state where a first forward movement of a shaping unit ends.

FIG. 8 is a cross-sectional view schematically illustrating a three-dimensional fabricating apparatus according to a third embodiment of the invention.

FIGS. 10A to 10C are explanatory diagrams illustrating a case where the shaping unit of the three-dimensional fabricating apparatus according to the third embodiment of the invention moves forward, where FIG. 10A illustrates a state before a shaping operation for a three-dimensional shaped object starts, FIG. 10B illustrates a state where a shaping unit moves forward, and FIG. 10C illustrates a state where a forward movement of the shaping unit ends.

FIG. 11A illustrates a state where the shaping unit is ready to move backward, FIG. 11B illustrates a state where the shaping unit moves backward, and FIG. 11C illustrates a state where the shaping unit is ready to move forward after the backward movement ends.

FIGS. 12A to 12C are explanatory diagrams illustrating a case where a shaping unit moves forward in a three-dimensional fabricating apparatus according to a fourth embodiment of the invention, where FIG. 12A illustrates a state before a shaping operation for a three-dimensional shaped object starts, FIG. 12B illustrates a state where the shaping unit moves forward, and FIG. 12C illustrates a state where a powder material layer is further formed from the state of FIG. 12B.

FIG. 13 is a cross-sectional view schematically illustrating a three-dimensional fabricating apparatus according to a fifth embodiment of the invention, where a casing is omitted.

FIG. 16 is a longitudinal sectional view illustrating the same.

FIG. 17 is a top view schematically illustrating a three-dimensional fabricating apparatus according to a sixth embodiment of the invention.

FIG. 18 is a front view illustrating the same.

FIG. 19 is a bottom view schematically illustrating a rotation member of the three-dimensional fabricating apparatus according to the sixth embodiment of the invention.

FIG. 20 is a front view illustrating a method of forming a three-dimensional shaped object in the three-dimensional fabricating apparatus according to the sixth embodiment of the invention.

FIG. 21 is a front view illustrating a state where the three-dimensional shaped object is further shaped from the state of FIG. 20.

FIG. 24 is a top view schematically illustrating a three-dimensional fabricating apparatus different from FIGS. 17 to 23.

FIG. 25 is a front view illustrating the same.

FIG. 26 is a main enlarged side view schematically illustrating a shaping unit different from the shaping unit of FIG. 8 in that the arrangement of the powder material supply device and the binder liquid supply device is partially different.

FIGS. 27A and 27B are explanatory diagrams illustrating a case where the shaping unit having the configuration of FIG. 26 moves on a powder material layer, where FIG. 27A illustrates a state where the shaping unit moves forward and FIG. 27B illustrates a state where the shaping unit moves backward.

DESCRIPTION OF EMBODIMENTS

Figure 1:
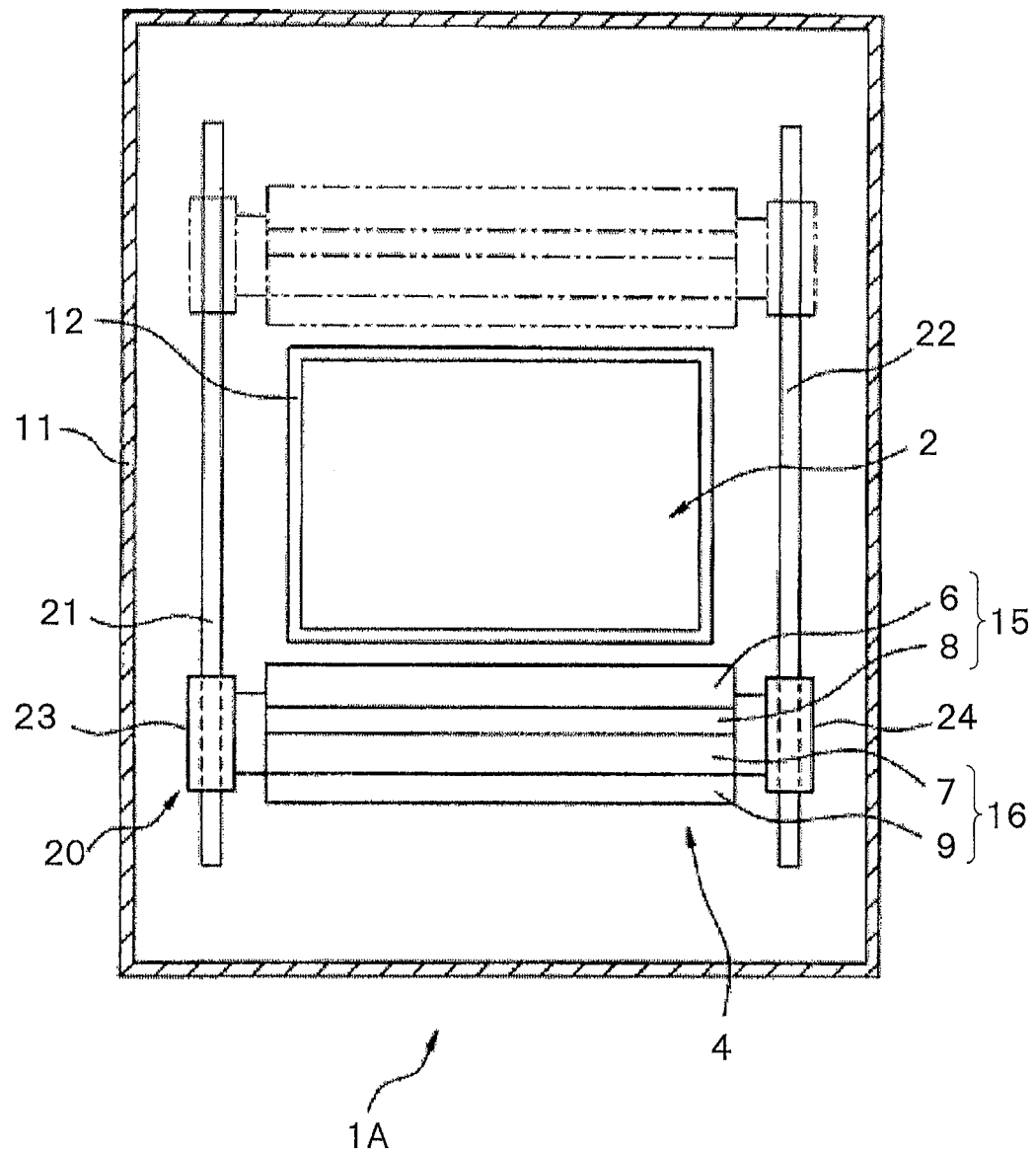
FIG. 1 is a cross-sectional view schematically illustrating a three-dimensional fabricating apparatus according to a first embodiment of the invention.

FIGS. 1, 2, 3 4A, 4B and 4C illustrate a first embodiment of a three-dimensional fabricating apparatus of the invention. Here, a three-dimensional fabricating apparatus 1A of the embodiment is used to shape an object by a powder, and includes a single table 2 on which a powder material forming a three-dimensional shaped object (hereinafter, referred to as a "shaped object") is stacked as a layer and a shaping unit 4 which forms a powder material layer 3 on a top surface 2a of the table 2.

Further, the shaping unit 4 includes a plurality of powder material supply devices 6 and 7 which supplies a powder material 5 onto the top surface 2a of the table 2 by every predetermined layer thickness and a plurality of binder liquid supply devices 8 and 9 which ejects a binder liquid to the powder material 5 supplied onto the top surface 2a of the table 2 so as to bind the powder material 5. Accordingly, when the powder material 5 is supplied from the powder material supply devices 6 and 7 onto the top surface 2a of the table 2 so as to form a layer having a predetermined thickness and the binder liquid is supplied from the binder liquid supply devices 8 and 9 to the powder material 5 supplied onto the top surface 2a of the table 2, it is possible to form the powder material layer 3 in which layers 10 of a part of a shaped object of a shaping target is shaped inside the powder material 5.

Then, when the powder material layer 3 formed by the shaping unit 4 is sequentially stacked, the powder material layer 3 is formed just by moving linearly in a predetermined movement direction, that is, the backward and forward directions of the three-dimensional fabricating apparatus 1A.

Further, in the embodiment, the shaping unit 4 includes two first and second powder material supply devices 6 and 7 and two first and second binder liquid supply devices 8 and 9, and is stored inside a casing 11 along with the table 2.

Further, the formation of the powder material layer 3 in which layers 10 of a part of the shaped object of the shaping target is shaped by the shaping unit 4 is controlled based on data (for example, data having an STL (Standard Triangulated Language) file format) of the shaped object as the shaping target input to an electronic computer (not illustrated). Then, the powder material is supplied onto the top surface 2a of the table and the binder liquid is ejected thereto in accordance with the shape of the shaped object.

The top surface 2a of the table 2 is flat and horizontal, and the top surface 2a is movable downward in the vertical direction in the horizontal state in response to the forming and stacking height of the powder material layer 3.

Further, the top surface 2a of the table 2 is formed in a substantially rectangular shape in the top view in a direction (in the case of the embodiment, the left and right direction of the three-dimensional fabricating apparatus 1A) orthogonal to the movement direction of each of the powder material supply devices 6 and 7 and the binder liquid supply devices 8 and 9.

Further, the table 2 is stored inside a cylindrical member 12 extending in the vertical direction and formed in a rectangular frame shape surrounding the front surface (the near side), the rear surface (the back side), and both left and right surfaces of the top surface 2a of the table 2 in the top view. Then, whenever the powder material layer 3 is formed and stacked on the top surface 2a of the table 2, the table 2 moves downward inside the cylindrical member 12.

Thus, the shaping operation is completed finally while the shaped object as the shaping target is stored inside the cylindrical member 12 along with the powder material 5 which is not bound by the binder liquid.

Further, the table 2 is provided with a table elevation device (not illustrated) which elevates the table 2 in the vertical direction.

As the table elevation device, an arbitrary configuration can be used as long as a stable elevation and a precise position control can be performed. For example, a ball screw can be used which includes a screw shaft extending in the vertical direction and a nut moving in the axial direction along the outer circumferential surface of the screw shaft with the rotation of the screw shaft. That is, when the screw shaft is rotated by an electric motor or the like while the upper end of the screw shaft is connected to the lower surface of the table 2 and the nut is immovably fixed to a base, the table 2 is elevated by the elevation of the screw shaft.

Alternatively, a chain conveyor may be used in which a chain moves in the vertical direction so that the table 2 is elevated by the movement of the chain of the chain conveyor.

Further, a hydraulic cylinder may be used in which a piston moves up and down in the vertical direction. When the piston is moved while a front end of a piston rod of the hydraulic cylinder is connected to the lower surface of the table, the table 2 can be elevated.

Further, it is desirable to elevate the table 2 while guiding the table by a guide rail in the vertical direction. In this case, a linear guide having a columnar or spherical rolling element can be used in order to smoothly elevate the table 2.

Since the first and second powder material supply devices 6 and 7 of the shaping unit are provided so as to be linearly movable in one direction (in the case of the embodiment, the backward and forward directions (a direction substantially parallel to the transversal direction of the top surface 2a of the table 2) of the three-dimensional fabricating apparatus 1A) while being close to the top surface 2a of the table 2, the powder material 5 can be supplied onto the top surface 2a of the table 2 at a predetermined supply width while the first and second powder material supply devices move.

Specifically, as illustrated in FIG. 3, the first and second powder material supply devices 6 and 7 respectively include storage portions 6a and 7a which extend in a direction (that is, the left and right direction (a direction substantially parallel to the longitudinal direction of the top surface 2a of the table 2) of the three-dimensional fabricating apparatus 1A) orthogonal to the movement direction and are used to store the powder material 5. Further, the first and second powder material supply devices include outlets 6b and 7b which are respectively provided in the storage portions 6a and 7a so as to drop the powder material inside the storage portions 6a and 7a onto the top surface 2a of the table 2 and extend in a direction orthogonal to the movement directions of the powder material supply devices 6 and 7.

Accordingly, the first and second powder material supply devices 6 and 7 are capable of supplying the powder material supplied from a hopper (not illustrated) into the storage portions 6a and 7a onto the top surface 2a of the table 2 at a predetermined layer thickness through the outlets 6b and 7b while moving in the transversal direction of the top surface 2a of the table 2.

Further, the first and second powder material supply devices 6 and 7 are capable of supplying the powder material 5 at the same width as the length in the longitudinal direction of the top surface 2a of the table 2. Accordingly, when the first and second powder material supply devices 6 and 7 move once linearly in the transversal direction of the top surface 2a of the table 2, the powder material 5 can be supplied to the entire top surface 2a of the table 2.

Moreover, the first and second powder material supply devices 6 and 7 are provided with flattening members for flattening the powder material 5 supplied onto the top surface 2a of the table 2. In the embodiment, the lower ends of the first and second powder material supply devices 6 and 7 are respectively provided with plate-shaped flattening members 6c and 7c which protrude downward in the vertical direction and extend in the longitudinal directions of the first and second powder material supply devices 6 and 7. When the flattening members 6c and 7c contact the top surface of the powder material 5 supplied onto the top surface 2a of the table 2, the powder material is flattened.

Further, as the powder material used in the invention, for example, organic resin, metal, ceramic, starch, glass powder, and the like can be used.

Specifically, polystyrene resin, nylon (polyamide) resin, polycarbonate resin, acrylic (PMMA (polymethylmethacrylate)) resin, PEEK (polyetheretherketone) resin, organic resin having glass filler, organic resin having carbon fiber, fine wax, casting sand, aluminum silicate, gypsum, starch, quartz, $Ti_6Al_4V$, $AlSi_{12}$, $AlSi_{10}Mg$, cobalt-chromium alloy, nickel alloy, stainless alloy, iron, steel, and the like can be used.

Further, the pobject diameter of the powder material is not limited as long as the pobject diameter is smaller than the layer thickness of the formed powder material layer. Here, the pobject diameter is about from 1 μm to 300 μm, further preferably from 10 μm to 200 μm, and more preferably from 50 to 150 μm.

In addition, the layer thickness of the powder material supplied from the powder material supply device onto the top surface of the table is different in response to the shaped object as the shaping target. Here, the layer thickness is about from 0.01 to 0.5 mm, further preferably from 0.025 to 0.3 mm, and more preferably from 0.05 to 0.15 mm.

Meanwhile, the first and second binder liquid supply devices 8 and 9 are formed so as to be movable linearly in the same direction as the first and second powder material supply devices 6 and 7, that is, the backward and forward directions (a direction substantially parallel to the transversal direction of the top surface 2a of the table 2) while being close to the top surface 2a of the table 2.

Then, the binder liquid can be ejected onto the top surface 2a of the table 2 at the same ejection width as the powder material supply width of each of the powder material supply devices 6 and 7 in maximum.

Specifically, as illustrated in FIG. 3, the first and second binder liquid supply devices 8 and 9 respectively include inkjet heads 8a and 9a which extend horizontally in a direction (in the case of the embodiment, the left and right direction (a direction substantially parallel to the longitudinal direction of the top surface 2a of the table 2) of the three-dimensional fabricating apparatus 1A) intersecting the movement directions of the binder liquid supply devices 8 and 9 and eject the binder liquid toward the powder material 5 supplied onto the top surface 2a of the table 2.

The inkjet heads 8a and 9a are so-called line type heads which are long in the left and right direction of the three-dimensional fabricating apparatus 1A, and are capable of ejecting the binder liquid at one time at the same ejection width as the powder material supply width of each of the powder material supply devices 6 and 7 in maximum from a binder ejection nozzle. Then, the binder liquid can be ejected to the powder material 5 while the ejection width is increased and decreased in response to the shape of the shaped object as the shaping target.

Thus, the first and second binder liquid supply devices 8 and 9 can eject the binder liquid to the entire powder material 5, having one layer, supplied onto the top surface 2a of the table 2 while moving once linearly in the transversal direction of the table 2 without moving completely in the left and right direction of the three-dimensional fabricating apparatus 1A.

In addition, the binder liquid ejection amount of each of the first and second binder liquid supply devices 8 and 9 is different depending on the type of the binder liquid or the size of the powder material to be hardened by one ejection. Here, the binder liquid ejection amount is from 1 pl to 200 pl, further preferably from 10 pl to 150 pl, and more preferably from 30 pl to 100 pl.

Furthermore, as an ejection mechanism of each of the inkjet heads 8a and 9a, an existing piezoelectric or thermal mechanism can be used.

Further, the binder liquid used in the invention can be freely set in response to the type of the powder material. Here, for example, when the powder material is gypsum or starch, a liquid mainly including water can be used. Further, various binder liquids used in a general inkjet printer can be used. At this time, the binder liquid can be dyed by using dyes or pigments.

As the binder liquid, for example, organic ester, furfuryl alcohol, polyisocyanate, or a combination of polyisocyanate and tertiary amines can be exemplified. Further, a combination of furfuryl alcohol and formaldehyde or a combination of furfuryl alcohol, formaldehyde, and urea can be used if necessary.

In addition, when the powder material is supplied from the powder material supply devices 6 and 7 onto the top surface 2a of the table 2 at a predetermined layer thickness in consideration of the characteristic of the binder liquid used in the binder liquid supply devices 8 and 9 or the binding speed of the powder material using the binder liquid, an additive can be mixed with the powder material before the powder material is supplied onto the top surface 2a of the table 2.

The additive is selected in response to the type of the binder liquid.

For example, when the binder liquid is organic ester, silicate soda or alkali phenol can be used.

Further, when the binder liquid is furfuryl alcohol, acid such as phosphoric acid, sulfuric acid, p-toluenesulfonic acid, xylenesulfonic acid, and benzenesulfonic acid as catalyst can be used in the additive. In some cases, phenol resin can be added in addition to these acids.

Furthermore, when the binder liquid is a combination of furfuryl alcohol and formaldehyde, urea or acids above as catalyst can be used in the additive.

When the binder liquid is polyisocyanate, a combination of alkyd resin and metallic soap or a combination of amine polyol resin and metallic soap can be used in the additive. Further, when the binder liquid is a combination of polyisocyanate and tertiary amines, benzylic ether type phenol resin can be used as the additive.

Incidentally, as illustrated in FIGS. 1, 3, and 4, in the shaping unit 4 of the embodiment, the first and second powder material supply devices 6 and 7 and the first and second binder liquid supply devices 8 and 9 are disposed alternately and linearly in the movement direction, and the first powder material supply device 6 is located at the foremost side in the forward movement direction from the origin position. Thus, the shaping unit 4 has a configuration in which the first powder material supply device 6, the first binder liquid supply device 8, the second powder material supply device 7, and the second binder liquid supply device 9 are disposed in series in this order from the front side in the forward movement direction.

Then, one group includes the powder material supply device located at the front side in the movement direction and the binder liquid supply device located adjacently subsequently after the powder material supply device located at the front side, and the binder liquid is ejected from the binder liquid supply device of the same group to the powder material supplied from the powder material supply device of each group to the table. That is, in the case of the embodiment, the first group 15 including the first powder material supply device 6 and the first binder liquid supply device 8 and the second group 16 including the second powder material supply device 7 and the second binder liquid supply device 9 are provided, and these groups 15 and 16 are capable of independently supplying the powder material 5 to the table 2 and ejecting the binder liquid to the powder material 5.

Further, in the first and second groups 15 and 16 each including the powder material supply device and the binder liquid supply device, the powder material supply position and the binder liquid ejection position of the first group 15 located at the foremost position in the movement direction (the forward movement direction) are lowest, and the powder material supply position and the binder liquid ejection position of the subsequent second group 16 including the powder material supply device and the binder liquid supply device are set to be higher by the thickness of one powder material layer 3.

Accordingly, the first group 15 and the second group 16 can form the powder material layers 3 so that the powder material layers are displaced by one layer thickness. For this reason, when the shaping unit 4 moves forward, the front first group 15 forms the powder material layer 3, and the subsequent second group 16 can form a new powder material layer 3 so that the new powder layer is stacked on the powder material layer 3 formed by the first group 15 with a slight time difference.

Thus, the shaping unit 4 can form two powder material layers 3 and 3 in a stacked state while moving forward once.

Further, the shaping unit 4 has a configuration in which two powder material supply devices 6 and 7 and two binder liquid supply devices 8 and 9 are integrally formed with one another in the above-described arrangement order.

Thus, when the entire shaping unit 4 can move freely, the powder material supply devices 6 and 7 and the binder liquid supply devices 8 and 9 move together in the same direction.

As a result, in the first group 15, the first binder liquid supply device 8 moves so as to follow the movement of the first powder material supply device 6. Then, in the second group 16, the second binder liquid supply device 9 moves so as to follow the movement of the second powder material supply device 7, and further the second group 16 moves so as to follow the movement of the first group 15.

In addition, the shaping unit 4 is provided with a shaping unit movement device 20 which moves the shaping unit 4 in the backward and forward directions, and the powder material supply devices 6 and 7 and the binder liquid supply devices 6 and 9 can be moved horizontally by the movement device 20.

In the embodiment, as described above, since the powder material supply devices 6 and 7 and the binder liquid supply devices 8 and 9 are integrally formed with one another, the entire shaping unit 4 is moved by the single movement device 20.

As the shaping unit movement device, in the case illustrated in FIGS. 1 and 2, the shaping unit movement device includes a guide mechanism which includes a pair of left and right guide rails 21 and 22 extending linearly and horizontally in the backward and forward directions of the three-dimensional fabricating apparatus 1A so as to be parallel to each other and a pair of movement members 23 and 24 movable on the pair of guide rails 21 and 22 and a drive member (not illustrated) which moves the pair of movement members 23 and 24 along the guide rails 21 and 22. The pair of movement members 23 and 24 is respectively connected to both ends of the shaping unit 4 in the longitudinal direction and is movable along with the shaping unit 4.

Then, when the drive member is driven so as to move the movement members 23 and 24 on the guide rails 21 and 22, the shaping unit 4 moves linearly and horizontally in the backward and forward directions of the three-dimensional fabricating apparatus 1A along the guide rails 21 and 22.

Here, it is desirable that the guide mechanism be a linear guide in which a spherical or columnar rolling element is disposed between the guide rails 21 and 22 and the movement members 23 and 24 so that the movement member can be moved smoothly.

In addition, as the drive member, a drive member having an arbitrary configuration can be used as long as the shaping unit 4 can be stably moved and the position thereof can be precisely controlled. For example, a ball screw and an electric motor can be used. That is, the ball screw may include a screw shaft which extends in parallel to the longitudinal directions of the guide rails 21 and 22 and a nut which is directly connected to the movement members 23 and 24 or the shaping unit 4 and moves along the outer circumferential surface of the screw shaft in the axial direction with the rotation of the screw shaft and the electric motor may be used to rotate the screw shaft of the ball screw. Then, when the screw shaft of the ball screw is rotated by the electric motor, the shaping unit 4 can be moved.

Alternatively, a chain conveyor may be provided in which a chain rotates in the longitudinal directions of the guide rails 21 and 22, and hence the movement members 23 and 24 and the shaping unit 4 may be moved by the chain conveyor.

Further, as the drive member, a hydraulic cylinder may be used in which a piston moves forward and backward in the longitudinal directions of the guide rails 21 and 22. When a front end of a piston rod of the hydraulic cylinder is connected to the movement members 23 and 24 or the shaping unit 4 and the piston is moved, the entire shaping unit 4 can move freely.

A method of fabricating the shaped object by using the three-dimensional fabricating apparatus 1A with the above-described configuration will be described.

When the shaped object as the shaping target is formed, the table 2 is moved upward to the upper end position inside the cylindrical member 12 as a preparation step. Further, in a state where the shaping unit 4 is returned to the origin position (in the case of the embodiment, the front side of the table 2), the powder material 5 is supplied to the powder material supply devices 6 and 7 and the binder liquid is charged into the binder liquid supply devices 8 and 9.

Then, as illustrated in FIG. 4A, the shaping unit 4 is moved forward linearly and the powder material 5 is supplied at a predetermined layer thickness from the first powder material supply device 6 as the first group 15 onto the top surface 2a of the table 2.

Then, the binder liquid is ejected from the first binder liquid supply device 8 located adjacently subsequently after the first powder material supply device 6 to the powder material 5 supplied onto the top surface 2a of the table 2 while matching the shape of the lowermost layer of the shaped object as the shaping target so as to bind the powder material.

Accordingly, the first powder material layer 26 as the powder material layer 3 including a part of layers 10 of the shaped object as the shaping target is continuously formed.

Further, as illustrated in FIG. 4B, when the second powder material supply device 7 as the second group 16 reaches the first powder material layer 26 formed by the first group 15 in accordance with the forward movement of the shaping unit 4 while the first powder material layer 26 is formed, a new powder material 5 is supplied at a predetermined layer thickness from the second powder material supply device 7 onto the top surface 2a of the table 2, more specifically, the first powder material layer 26.

Then, the binder liquid is ejected from the second binder liquid supply device 9 located adjacently subsequently after the second powder material supply device 7 to the new powder material 5 supplied onto the first powder material layer 26 in a direction from the downside of the shaped object as the shaping target while matching the shape of the second layer so as to bind the powder material. Accordingly, the second powder material layer 27 as the powder material layer 3 including a part of layers 10 of the shaped object as the shaping target is formed on the first powder material layer 26 in a stacked state.

When the first powder material supply device 6 and the first binder liquid supply device 8 of the first group 15 is separated from the top surface 2a of the table 2 by the forward movement of the shaping unit 4, the formation of the first powder material layer 26 by the first group 15 ends. Then, when the shaping unit 4 is moved forward further so that the second powder material supply device 7 and the second binder liquid supply device 8 of the second group 16 are separated from the top surface 2a of the table 2, more specifically, the top surface of the first powder material layer 26, the formation of the second powder material layer 27 by the second group 16 also ends.

Subsequently, as illustrated in FIG. 4C, the table 2 is moved downward by the thickness of two powder material layers in the vertical direction so that the top surface of the second powder material layer 27 is located at the upper end inside the cylindrical member 12, and the shaping unit 4 is moved to the origin position (the front side position of the table 2) without contacting the first and second powder material layers 26 and 27.

Then, the shaping unit 4 is moved forward again so that two new powder material layers 3 and 3 are formed on the second powder material layer 27, and then two powder material layers are sequentially stacked while the top surface 2a of the table 2 is moved downward by the thickness of two powder material layers. Then, a part of layers 10 of the shaped object inside the bound powder material layer are stacked, and finally the shaped object as the shaping target is completed.

Further, since the shaped object is stored inside the cylindrical member 12 along with the unbound powder material 5, the shaped object can be extracted when the unbound powder material 5 is removed.

In this way, according to the three-dimensional fabricating apparatus 1A with the above-described configuration, the binder liquid supply devices 8 and 9 ejecting the binder liquid are moved in the same direction as the powder material supply devices 6 and 7 while following the movement of the powder material supply devices 6 and 7 supplying the powder material 5 onto the top surface 2a of the table 2, and the binder liquid is ejected to the powder material 5 supplied onto the top surface 2a of the table 2.

Accordingly, since the supply of the powder material 5 onto the top surface 2a of the table 2 and the ejection of the binder liquid can be performed with a slight time difference, the supply of the powder material and the ejection of the binder liquid can be highly efficiently performed compared to the case where the powder material supply device or the binder liquid supply device is returned to the origin position when the operation involved with the supply of the powder material by the powder material supply device and the operation involved with the ejection of the binder liquid by the binder liquid supply device are switched as in the related art.

As a result, since it is possible to form and stack the powder material layer 3 with high efficiency in a short time, it is possible to remarkably shorten the shaping time of the shaped object as the shaping target.

In addition, in the case of the embodiment, the shaping unit 4 includes the first group 15 with the first powder material supply device 6 and the first binder liquid supply device 8 and the second group 16 with the second powder material supply device 7 and the second binder liquid supply device 9.

Accordingly, since a plurality of (in this case, two) powder material layers 3 and 3 is formed in a stacked state while the shaping unit 4 moves forward once, the shaping efficiency is remarkably improved. Accordingly, there is an advantage that the shaping time of the shaped object can be remarkably shortened.

Figure 5:
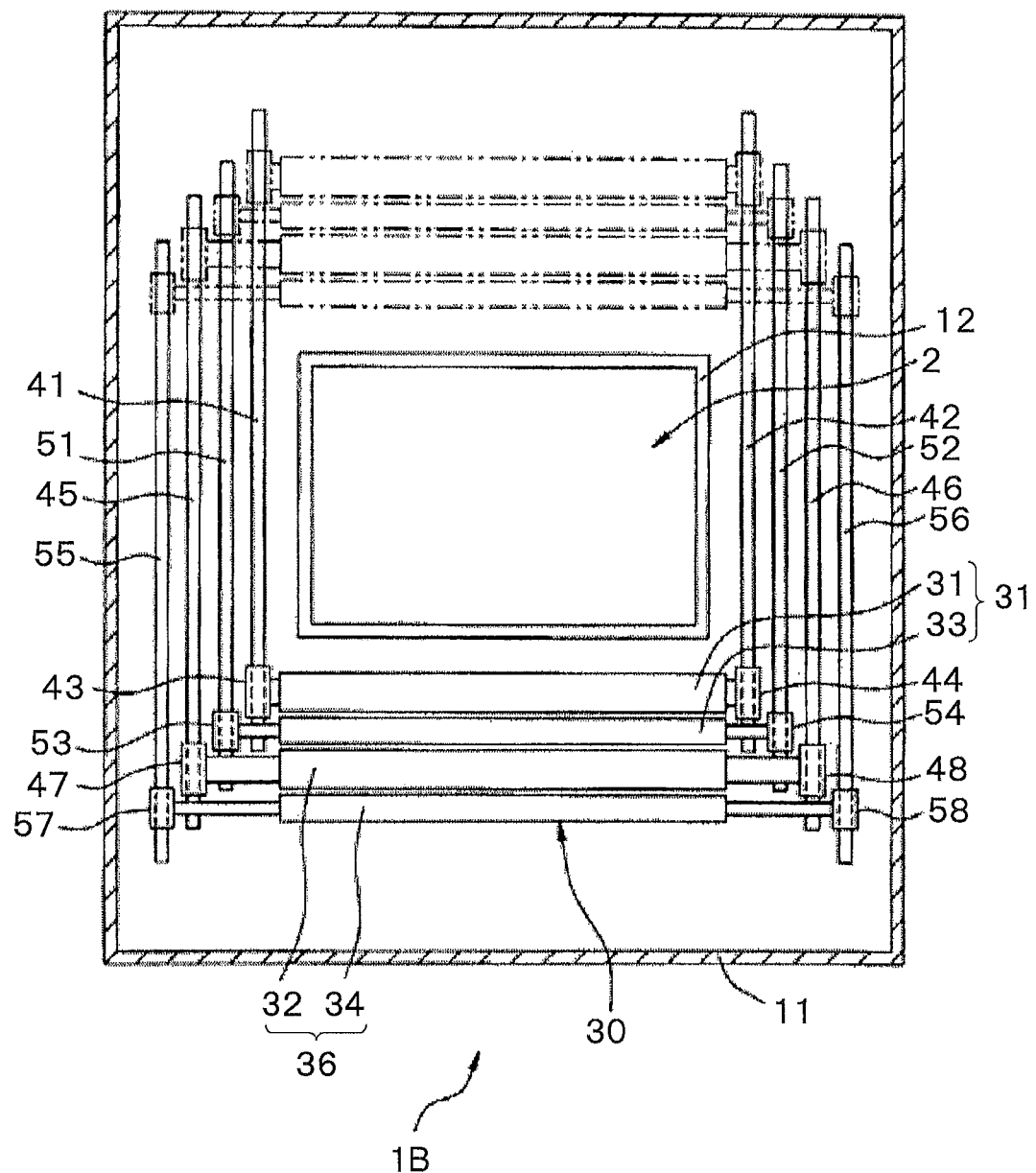
FIG. 5 is a cross-sectional view schematically illustrating a three-dimensional fabricating apparatus according to a second embodiment of the invention.

FIGS. 5 to 7 illustrate a second embodiment of the three-dimensional fabricating apparatus of the invention. Here, a three-dimensional fabricating apparatus 1B of the second embodiment has a configuration in which the powder material supply device and the binder liquid supply device of the shaping unit are separated from each other compared to the configuration in which the powder material supply devices 6 and 7 and the binder liquid supply devices 8 and 9 of the shaping unit 4 are integrally formed with one another in the first embodiment.

That is, as illustrated in FIGS. 6 and 7, in the embodiment, a shaping unit 30 includes two powder material supply devices 31 and 32 and two binder liquid supply devices 33 and 34, and the powder material supply devices 31 and 32 and the binder liquid supply devices 33 and 34 are separated from one another and are movable independently.

Specifically, the shaping unit 30 includes the first and second powder material supply devices 31 and 32 which supply the powder material 5 onto the top surface 2a of the table 2 by every predetermined thickness and the first and second binder liquid supply devices 33 and 34 which eject the binder liquid to the powder material 5 supplied onto the top surface 2a of the table 2 so as to bind the powder material 5.

The first and second powder material supply devices 31 and 32 and the first and second binder liquid supply devices 33 and 34 are all movable horizontally and linearly in the same direction (in the case of the embodiment, the backward and forward directions (a direction substantially parallel to the transversal direction of the top surface 2a of the table 2) of the three-dimensional fabricating apparatus 1B).

Furthermore, in the embodiment, the powder material layer 3 whenever the shaping unit 30, more specifically, the powder material supply devices 31 and 32 and the binder liquid supply devices 33 and 34 move linearly in a predetermined movement direction, that is, the backward and forward directions of the three-dimensional fabricating apparatus 1B.

Further, in the shaping unit 30, the first and second powder material supply devices 31 and 32 and the first and second binder liquid supply devices 33 and 34 are disposed alternately and linearly in the movement direction, and the first powder material supply device 31 is located at the foremost side in the forward movement direction from the origin position (the front side position of the table 2). Thus, the shaping unit 30 has a configuration in which the first powder material supply device 31, the first binder liquid supply device 33, the second powder material supply device 32, and the second binder liquid supply device 34 are disposed in series in this order from the front side in the forward movement direction.

Then, a first group 35 includes the first powder material supply device 31 and the first binder liquid supply device 33, and a second group 36 includes the second powder material supply device 32 and the second binder liquid supply device 34. Accordingly, in the first group 35, the first binder liquid supply device 33 moves so as to follow the movement of the first powder material supply device 31. Then, in the second group 36, the second binder liquid supply device 34 moves so as to follow the movement of the second powder material supply device 32. Here, in the groups 35 and 36, the supply of the powder material 5 to the table 2 and the ejection of the binder liquid to the powder material 5 can be independently performed.

In addition, the first and second powder material supply devices 31 and 32 and the first and second binder liquid supply devices 33 and 34 are respectively provided with separately movable movement devices.

In the case illustrated in FIG. 5, the movement device of the embodiment includes a guide mechanism which includes a pair of left and right guide rails extending linearly and horizontally in the backward and forward directions of the three-dimensional fabricating apparatus 1B so as to be parallel to each other and a pair of movement members movable on the pair of guide rails and a drive member (not illustrated) which moves the pair of movement members along the guide rails. The movement device is provided for each of the first and second powder material supply devices 31 and 32 and the first and second binder liquid supply devices 33 and 34. The pair of movement members is respectively connected to both ends of the first and second powder material supply devices 31 and 32 and the first and second binder liquid supply devices 33 and 34 in the longitudinal direction and is movable along with the shaping unit 4.

More specifically, the first powder material supply device 31 is provided with the drive member and the guide mechanism including the pair of left and right guide rails 41 and 42 and the pair of movement members 43 and 44, and the second powder material supply device 32 is provided with the drive member and the guide mechanism including the pair of left and right guide rails 45 and 46 and the pair of movement members 47 and 48.

Further, the first binder liquid supply device 33 is provided with the drive member and the guide mechanism including the pair of left and right guide rails 51 and 52 and the pair of movement members 53 and 54, and the second binder liquid supply device 34 is provided with the drive member and the guide mechanism including the pair of left and right guide rails 55 and 56 and the pair of movement members 57 and 58.

The guide rails of the guide mechanisms of the first and second powder material supply devices 31 and 32 and the first and second binder liquid supply devices 33 and 34 are disposed so as not to interfere with the guide rail of the other guide mechanism. Further, the movement members also do not contact the movement member of the other guide mechanism during the movement so that the movement is not disturbed.

Furthermore, since the configurations of the movement devices, that is, the configurations of the guide mechanism and the drive member are basically similar to those of the first embodiment, the same effect is obtained, and hence the detailed description thereof will be omitted.

In this way, the following is the reason why the powder material supply devices 31 and 32 and the binder liquid supply devices 33 and 34 of the shaping unit 30 are separated and are movable independently.

That is, the powder material or the binder liquid used to shape the shaped object is selected variously in response to the application purpose of the shaped object. However, there is a need to form a dense and flat layer by spending some time for supplying the powder material or to ensure some time for intruding the binder liquid into the powder material or binding the powder material in accordance with the powder material or the binder liquid in use.

Further, in the first and second groups 35 and 36 each including the powder material supply device and the binder liquid supply device, the first group 35 and the second group 36 may have a different powder material or binder liquid in use. Thus, there is a possibility that a new powder material layer 3 may not be appropriately formed on the powder material layer 3 by the second group 36 after the powder material layer 3 is formed by the first group 35 in accordance with the powder material binding state in the first group 35.

For that reason, in the embodiment, the powder material supply devices 33 and 34 and the binder liquid supply devices 35 and 36 are separated from one another and are independently movable. Accordingly, it is possible to control the powder material supply timing, the binder liquid ejection timing, or the movement speed in accordance with the powder material or the binder liquid in use.

Here, the movement speed of the powder material supply devices 31 and 32 and the binder liquid supply devices 33 and 34 can be arbitrarily set in accordance with the powder material or the binder liquid in use. However, it is desirable that the second binder liquid supply device 34 starts to move before the powder material supply device and the binder liquid supply device are separated from the top surface of the table by the forward movement of the first powder material supply device 31.

Furthermore, since the configuration is substantially similar to that of the first embodiment except that the powder material supply devices 31 and 32 and the binder liquid supply devices 33 and 34 of the shaping unit 30 are separated and are movable independently, the same effect is obtained, and hence the detailed description thereof will be omitted by giving the same reference numeral to the same component.

Further, since the configurations of the first and second powder material supply devices 31 and 32 and the configurations of the first and second binder liquid supply devices 33 and 34 are basically similar to those of the first embodiment, the detailed description thereof will be omitted.

When the shaped object of the shaping target is formed by the three-dimensional fabricating apparatus 1B with the above-described configuration, the shaping operation is performed similarly to the first embodiment.

Basically, as illustrated in FIGS. 6 and 7, when the first and second groups 35 and 36 of the powder material supply device and the binder liquid supply device of the shaping unit 30 are respectively moved forward, two powder material layers 3 and 3 are formed. That is, a new powder material layer 3 is formed and stacked on the powder material layer 3, formed by the first group 35, by the second group 36 including the second powder material supply device 32 and the second binder liquid supply device 34 while the powder material layer 3 is first formed by the first group 35 including the first powder material supply device 31 and the first binder liquid supply device 33.

Figure 6A:
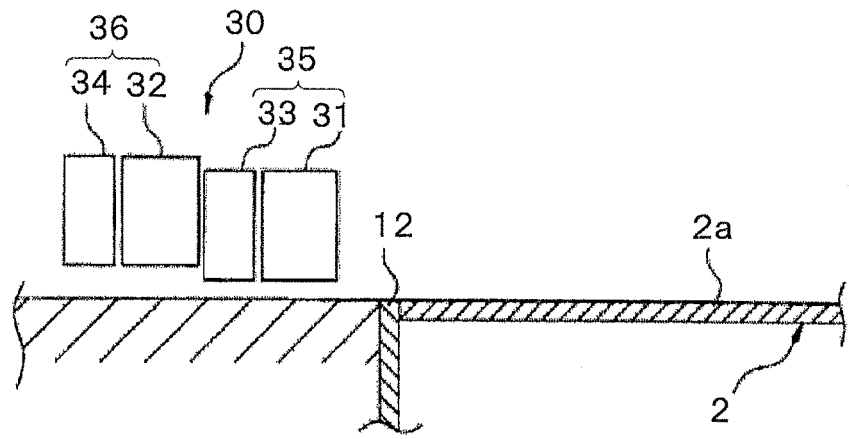
FIGS. 6A to 6C are explanatory diagrams illustrating a part of a method of forming a three-dimensional shaped object in the three-dimensional fabricating apparatus according to the second embodiment of the invention, where
Figure 6B:
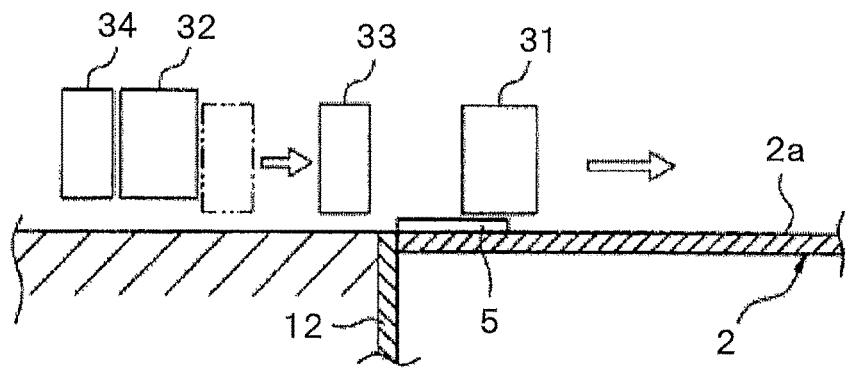
Figure 6C:
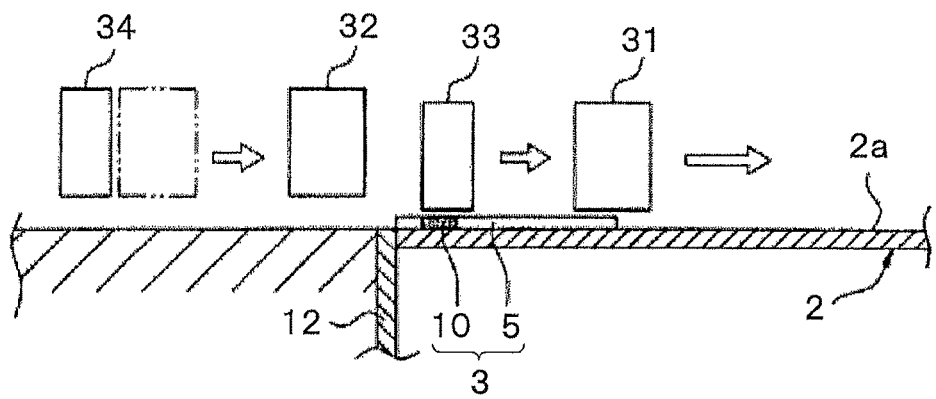
Figure 9:
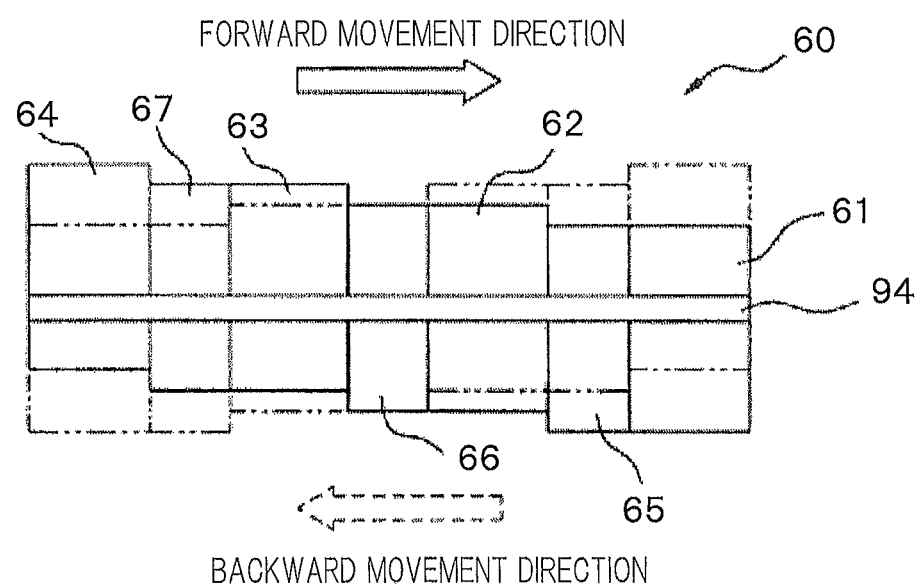
FIG. 9 is a main enlarged side view schematically illustrating a shaping unit of the three-dimensional fabricating apparatus according to the third embodiment of the invention, where a movement member is omitted.

At this time, as illustrated in FIGS. 6A to 6C, in the first group 35, only the first powder material supply device 31 is moved forward at the movement speed suitable for the powder material in use (see FIG. 6B). Next, only the first binder liquid supply device 33 is moved so as to follow the movement of the first powder material supply device 31 at the movement speed and the timing suitable for the powder material used by the first powder material supply device 31 and the binder liquid in use (see FIG. 6C).

In addition, as illustrated in FIGS. 7A to 7C, in the second group 36, the second powder material supply device 32 is moved forward so as to follow the movement of the first binder liquid supply device 33 at the timing and the movement speed suitable for the state of the powder material layer 3 formed by the first group 35, for example, the powder material bound state (see FIG. 7A). Further, the second binder liquid supply device 34 is moved forward so as to follow the movement of the second powder material supply device 32 at the movement speed and the timing suitable for the powder material used by the second powder material supply device 32 or the binder liquid in use (see FIG. 7B).

Accordingly, when the first and second powder material supply devices 31 and 32 and the first and second binder liquid supply devices 33 and 34 move forward once, two powder material layers 3 and 3 are formed.

Subsequently, when the first and second powder material supply devices 31 and 32 and the first and second binder liquid supply devices 33 and 34 are repeatedly moved forward and backward so as to sequentially stack two new powder material layers 3 and 3 while the top surface 2a of the table 2 is moved downward by the thickness of two powder material layers, a part of layers 10 of the shaped object inside the bound powder material layer are stacked and finally the shaped object as the shaping target is completed.

In the three-dimensional fabricating apparatus with the above-described configuration, the same effect as the first embodiment can be basically obtained.

Moreover, since the powder material supply devices 31 and 32 and the binder liquid supply devices 33 and 34 of the shaping unit 30 are separated from one another and the movement speed or the movement timing of each of the powder material supply devices 31 and 32 or the binder liquid supply devices 33 and 34 can be controlled in response to the powder material or the binder liquid in use, it is possible to further stably form and stack a plurality of powder material layers. Further, since there are many options of the powder material or the binder liquid in use, there is an advantage that the shaped object having a performance suitable for the application purpose can be more easily shaped.

FIGS. 8 to 11 illustrate a third embodiment of the three-dimensional fabricating apparatus of the invention. Here, a three-dimensional fabricating apparatus 1C of the third embodiment is capable of continuously forming the powder material layer when the shaping unit moves in a reciprocating manner (forward and backward) compared to the case where the powder material layer is formed when the shaping unit of the first or second embodiment moves forward.

That is, a shaping unit 60 of the three-dimensional fabricating apparatus 1C of the embodiment includes four powder material supply devices 61 to 64 and three binder liquid supply devices 65 to 67, and the powder material supply devices 61 to 64 and the binder liquid supply devices 65 to 67 are separated from one another.

Specifically, the shaping unit 60 includes the first to fourth powder material supply devices 61 to 64 which supply the powder material 5 onto the top surface 2a of the table 2 by every predetermined layer thickness and the first to third binder liquid supply devices 65 to 67 which eject the binder liquid to the powder material 5 supplied onto the top surface 2a of the table 2 so as to bind the powder material 5.

Then, the first to fourth powder material supply devices 61 to 64 and the first to third binder liquid supply devices 65 to 67 are all movable horizontally and linearly in the same direction (in the case of the embodiment, the backward and forward directions (a direction substantially parallel to the transversal direction of the top surface 2a of the table 2) of the three-dimensional fabricating apparatus 1C).

Furthermore, in the embodiment, the first to fourth powder material supply devices 61 to 64 and the first to third binder liquid supply devices 65 to 67 are separated from one another. However, the adjacent powder material supply devices or the adjacent binder liquid supply devices are adapted to move together in a contact state in the backward and forward directions of the three-dimensional fabricating apparatus 1C. Thus, the entire shaping unit 60 is capable of moving in a reciprocating manner (forward and backward) in one direction.

The movement of the shaping unit 60 is performed by the movement device 90, and the movement device 90 includes a pair of left and right guide rails 91 and 92, movement members 93 and 94 which are provided at both ends of the shaping unit 60 in the longitudinal direction and move on the pair of guide rails, and a drive member such as an electric motor (not illustrated). Further, since the movement device 90 basically has the same configuration as the first embodiment, the detailed description thereof will be omitted.

In addition, in the shaping unit 60, the first to fourth powder material supply devices 61 to 64 and the first to third binder liquid supply devices 65 to 67 are disposed alternately and linearly in the movement direction, and the powder material supply devices are respectively located at both ends of the shaping unit 60 in the movement direction.

That is, in the shaping unit 60, the powder material supply devices 61 to 64 and the binder liquid supply devices 65 to 67 are disposed in series in order of the first powder material supply device 61, the first binder liquid supply device 65, the second powder material supply device 62, the second binder liquid supply device 66, the third powder material supply device 63, the third binder liquid supply device 67, and the fourth powder material supply device 64 from the front side in the forward movement direction.

Thus, even when the shaping unit 60 moves forward and backward, the powder material supply device (the first powder material supply device 61 in the case of the forward movement and the fourth powder material supply device 64 in the case of the backward movement) is located at the foremost position in the movement direction. Then, one powder material layer 3 is formed by a group of the powder material supply device located at the front side in the movement direction and the binder liquid supply device located adjacently subsequently after the powder material supply device.

Incidentally, the first to fourth powder material supply devices 61 to 64 and the first to third binder liquid supply devices 65 to 67 of the shaping unit 60 are adapted to be movable upward and downward in the vertical direction, and the first to fourth powder material supply devices 61 to 64 and the first to third binder liquid supply devices are adapted to be movable upward and downward in the movement direction.

Specifically, the powder material supply position and the binder liquid ejection position of the group of the powder material supply device and the binder liquid supply device located at the foremost position in the movement direction are lowest, and the supply position and the binder liquid ejection position of the subsequent group of the powder material supply device and the binder liquid supply device increase in height by the thickness of one powder material layer as it goes toward the rearmost side in the movement direction. Thus, the position of the powder material supply device located at the rearmost side is highest.

Thus, when the shaping unit 60 moves forward, the powder material supply position and the binder liquid ejection position of the group (a first group 71 in the forward movement direction) of the first powder material supply device 61 and the first binder liquid supply device 62 located at the foremost end side in the movement direction are lowest.

Further, the powder material supply position and the binder liquid ejection position of the group (a second group 72 in the forward movement direction) of the second powder material supply device 62 and the second binder liquid supply device 66 as the group subsequently after the first group 71 in the forward movement direction are higher than the powder material supply position and the binder liquid ejection position of the first group 71 in the forward movement direction by the thickness of one powder material layer 3.

In addition, the powder material supply position and the binder liquid ejection position of the group (a third group 73 in the forward movement direction) of the third powder material supply device 63 and the third binder liquid supply device 67 as the group subsequently after the second group 72 in the forward movement direction are higher than the powder material supply position and the binder liquid ejection position of the second group 72 in the forward movement direction by the thickness of one powder material layer 3.

Then, the fourth powder material supply device 64 located at the rearmost position is located at a height not contacting the powder material layer 3 formed by the third group 73 in the forward movement direction, that is, a position higher than the powder material supply position and the binder liquid ejection position of the other powder material supply device and the other binder liquid supply device.

In contrast, when the shaping unit 60 moves backward, the height of the powder material supply position and the binder liquid coating position of each of the powder material supply devices 61 to 64 and each of the binder liquid supply devices 65 to 67 of the shaping unit 60 change from the case of the forward movement. Further, the group of the powder material supply device and the binder liquid supply device forming one powder material layer 3 also changes from the case of the forward movement.

That is, a group (a first group 75 in the backward movement direction) includes the fourth powder material supply device 64 and the third binder liquid supply device 67 located at the foremost side in the backward movement direction, and the powder material supply position and the binder liquid ejection position of the first group 75 in the backward movement direction are lowest.

In addition, a group (a second group 76 in the backward movement direction) includes the third powder material supply device 63 and the second binder liquid supply device 66 subsequently after the first group 75 in the backward movement direction, and the powder material supply position and the binder liquid ejection position of the second group 76 in the backward movement direction are higher than the powder material supply position and the binder liquid ejection position of the first group 75 in the backward movement direction by the thickness of one powder material layer 3.

Further, a group (a third group 77 in the backward movement direction) includes the second powder material supply device 62 and the first binder liquid supply device 65 located adjacently subsequently after the first group 75 in the backward movement direction, and the powder material supply position and the binder liquid ejection position of the third group 77 in the backward movement direction are higher than the powder material supply position and the binder liquid ejection position of the second group 76 in the backward movement direction by the thickness of one powder material layer 3.

The first powder material supply device located at the rearmost position is located at a height not contacting the powder material layer formed by the third group 77 in the backward movement direction, that is, a position higher than the powder material supply position and the binder liquid ejection position of the other powder material supply device and the other binder liquid supply device.

Furthermore, in the embodiment, the second binder liquid supply device 66 located at the center among the binder liquid supply devices 65 to 67 and the powder material supply devices 61 to 64 of the shaping unit 60 is not basically moved upward and downward even when the movement direction of the shaping unit 60 is not changed, and the other powder material supply devices 65 to 67 and the other binder liquid supply devices 65 and 67 move upward and downward in the movement direction of the shaping unit 60.

That is, when the shaping unit 60 moves forward based on the height of the second binder liquid supply device 66, the first and second powder material supply devices 61 and 62 and the first binder liquid supply device 65 located at the front side in relation to the second binder liquid supply device 66 move downward and the third and fourth powder material supply devices 63 and 64 and the third binder liquid supply device 67 located at the rear side move upward.

In contrast, when the shaping unit 60 moves backward, the third and fourth powder material supply devices 63 and 64 and the third binder liquid supply device 67 located at the front side in relation to the second binder liquid supply device 66 as the reference move downward and the first and second powder material supply devices 61 and 62 and the first binder liquid supply device 65 located at the rearmost side move upward.

The first to fourth powder material supply devices 61 to 64 and the first to third binder liquid supply devices 65 to 67 are respectively moved upward and downward by an elevation device (not illustrated).

As the elevation device, an arbitrary configuration can be used as long as the first to fourth powder material supply devices 61 to 64 and the first to third binder liquid supply devices 65 to 67 can be reliably moved upward and downward and the positions thereof can be precisely controlled.

For example, a ball screw can be used which includes a screw shaft extending in the vertical direction and a nut moving along the outer circumferential surface of the screw shaft in the axial direction by rotating the screw shaft by an electric motor or the like.

Alternatively, a chain conveyor may be provided in which a chain moves in the vertical direction, and the powder material supply devices 61 to 64 and the binder liquid supply devices 65 to 67 may be moved upward and downward by the movement of the chain of the chain conveyor.

Further, the powder material supply devices 61 to 64 and the binder liquid supply devices 65 to 67 can be moved upward and downward by a hydraulic cylinder of which a piston moves upward and downward in the vertical direction.

Alternatively, the powder material supply devices 61 to 64 and the binder liquid supply devices 65 to 67 may be provided with racks extending in the vertical direction, and the powder material supply devices 61 to 64 and the binder liquid supply devices 65 to 67 may be moved upward and downward by moving the racks in the up and down direction using the pinion rotated by the electric motor.

Further, it is desirable that the powder material supply devices 61 to 64 and the binder liquid supply devices 65 to 67 move upward and downward while being guided by the guide rails in the vertical direction. In this case, a linear guide including a columnar or spherical rolling element can be used in order to smoothly move the table 2 upward and downward. Further, it is desirable that the movement end portions of the powder material supply devices 61 to 64 and the binder liquid supply devices 65 to 67 in the guide rails be provided with stoppers that directly limit the movement operations of the powder material supply devices 61 to 64 and the binder liquid supply devices 65 to 67.

Furthermore, since the configurations of the first to fourth powder material supply devices 61 to 64 and the configurations of the first to third binder liquid supply devices 65 to 67 of the shaping unit 60 are basically similar to those of the powder material supply device and the binder liquid supply device of the first embodiment, the detailed description thereof will be omitted.

Further, since the configurations of the table 2 and the movement device of the shaping unit 60 are basically similar to those of the first embodiment, the detailed description thereof will be omitted.

A method of fabricating the shaped object by using the three-dimensional fabricating apparatus 1C with the above-described configuration will be described.

When the shaped object as the shaping target is formed, the table 2 is moved upward to the upper end position inside the cylindrical member 12 as a preparation step similarly to the first embodiment. Further, the shaping unit 60 charges the powder material into the powder material supply devices 61 to 64 and charges the binder liquid into the binder liquid supply devices 65 to 67 while being returned to the origin position (in the case of the embodiment, the front side of the table 2).

Then, when the shaping unit 60 is moved forward, the powder material supply devices 61 to 64 and the binder liquid supply devices 65 to 67 are moved upward and downward so that the shaping unit 60 is set to a forward movement mode in advance.

That is, as illustrated in FIG. 10A, in the shaping unit 60, the powder material supply position and the binder liquid ejection position of the first group 71 including the first powder material supply device 61 and the first binder liquid supply device 65 in the forward movement direction are set to be lowest. Further, in the subsequent second and third groups 72 and 73 of the powder material supply device and the binder liquid supply device in the forward movement direction, the powder material the supply position and the binder liquid ejection position are increased in height by the thickness of one powder material layer 3 as it goes toward the rear side in the movement direction, and the fourth powder material supply device 64 located at the rearmost position is located at the highest position.

Subsequently, as illustrated in FIG. 10B, the shaping unit 60 is moved forward linearly, and the powder material 5 is supplied from the first powder material supply device 61 as the first group 71 in the forward movement direction onto the top surface 2a of the table 2 during the forward movement.

Then, the binder liquid is ejected from the first binder liquid supply device 65 located adjacently subsequently after the first powder material supply device 61 to the powder material 5 supplied onto the top surface 2a of the table 2 while matching the shape of the lowermost layer of the shaped object as the shaping target so as to bind the powder material.

Accordingly, a first powder material layer 81 including the lowermost layer of the shaped object as the shaping target is formed.

Further, when the second powder material supply device 62 as the second group 72 in the forward movement direction reaches the first powder material layer 81 formed by the first group 71 in the forward movement direction in accordance with the forward movement of the shaping unit 60 while the first powder material layer 81 is formed, a new powder material 5 is supplied at a predetermined layer thickness from the second powder material supply device 62 onto the top surface 2a of the table 2, more specifically, the first powder material layer 81.

Then, the binder liquid is supplied from the second binder liquid supply device 66 located adjacently subsequently after the second powder material supply device 62 to the new powder material 5 supplied to the first powder material layer 81 in a direction from the downside of the shaped object as the shaping target while matching the shape of the second layer so as to bind the powder material.

Accordingly, a second powder material layer 82 including a second layer portion from the downside of the shaped object as the shaping target is formed.

In addition, when the third powder material supply device 63 as the third group 73 in the forward movement direction reaches the second powder material layer 82 formed by the second group 72 in accordance with the further forward movement of the shaping unit 60 while the second powder material layer 82 is formed, a new powder material 5 is supplied from the third powder material supply device 63 onto the top surface 2a of the table 2, more specifically, onto the second powder material layer 82 at a predetermined layer thickness.

Then, the binder liquid is ejected from the third binder liquid supply device 67 located adjacently subsequently after the third powder material supply device 63 to the new powder material 5 supplied to the second powder material layer 82 while matching the shape of the third layer from the downside of the shaped object as the shaping target so as to bind the powder material.

Accordingly, a third powder material layer 83 including a third layer portion from the downside of the shaped object as the shaping target is formed.

Furthermore, the fourth powder material supply device 64 moves in the forward movement direction without supplying the powder material.

As illustrated in FIG. 10C, when the fourth powder material supply device 64 is separated from the top surface 2a of the table 2 by the forward movement of the shaping unit 60 and the shaping unit 60 reaches the movement end position (in the case of the embodiment, the rear side position of the table 2), the movement of the shaping unit 60 in the forward movement direction first ends.

Figure 11A:
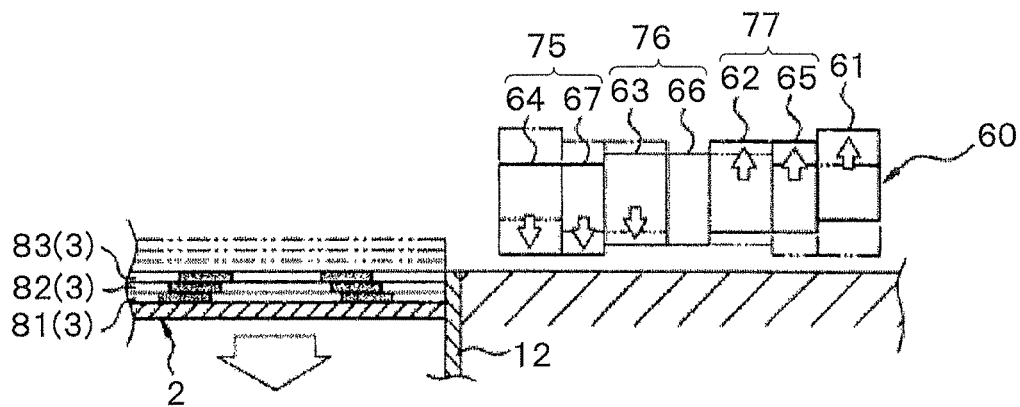
FIGS. 11A to 11C are explanatory diagrams illustrating a case where the shaping unit moves backward in the three-dimensional fabricating apparatus according to the third embodiment of the invention, where

Then, the shaping unit 60 prepares for the next operation. That is, the shaping unit gets ready for the movement in the backward movement direction. That is, as illustrated in FIG. 11A, the powder material supply devices 61 to 64 and the binder liquid supply devices 65 to 67 are moved upward and downward so that the shaping unit 60 is set to a backward movement mode.

Specifically, in the shaping unit 60, the powder material supply position and the binder liquid ejection position of the first group 75 in the backward movement direction from the fourth powder material supply device 64 and the third binder liquid supply device 67 are set to be lowest. Further, in the subsequent second and third groups 76 and 77 of the powder material supply device and the binder liquid supply device in the backward movement direction, the supply position and the binder liquid ejection position increase in height by the thickness of one powder material layer 3 as it goes toward the rear side in the movement direction, and the position of the first powder material supply device 61 located at the rearmost position is changed to the highest position.

Meanwhile, the table 2 is moved downward by the thickness of three powder material layers 3, and the top surface of the third powder material layer 83 is located at the upper end inside the cylindrical member 12.

Figure 11B:
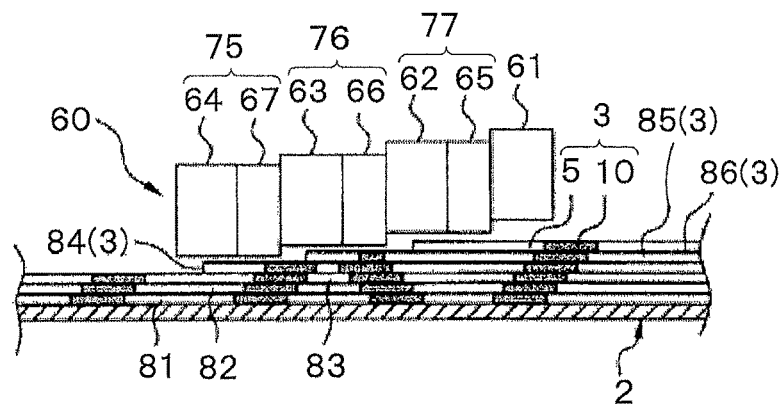

Subsequently, as illustrated in FIG. 11B, the shaping unit 60 is linearly moved backward toward the origin position, and the powder material 5 is supplied at a predetermined layer thickness from the fourth powder material supply device 64 as the first group 75 in the backward movement direction on the top surface 2a of the table 2, more specifically, on the third powder material layer 83 finally formed by the movement in the forward movement direction.

Then, the binder liquid is ejected from the third binder liquid supply device 67 located adjacently subsequently after the fourth powder material supply device 64 to the powder material 5 supplied from the fourth powder material supply device 64 while matching the shape of a fourth layer from the downside of the shaped object as the shaping target so as to bind the powder material.

Accordingly, a fourth powder material layer 84 including a fourth layer portion from the downside of the shaped object as the shaping target is formed.

Further, when the third powder material supply device 63 as the second group 76 in the backward movement direction reaches the fourth powder material layer 84 formed by the first group 75 in the backward movement direction in accordance with the backward movement of the shaping unit 60 while the fourth powder material layer 74 is formed, a new powder material 5 is supplied at a predetermined layer thickness from the third powder material supply device 63 onto the top surface 2a of the table 2, more specifically, onto the fourth powder material layer 84.

Then, the binder liquid is ejected from the second binder liquid supply device 66 located adjacently subsequently after the third powder material supply device 63 to the new powder material 5 supplied to the fourth powder material layer 84 while matching the shape of a fifth layer from the downside of the shaped object as the shaping target so as to bind the powder material.

Accordingly, a fifth powder material layer 85 including a fifth layer portion from the downside of the shaped object as the shaping target is formed.

In addition, when the second powder material supply device 62 as the third group 77 in the backward movement direction reaches the fifth powder material layer 85 formed by the second group 76 in the backward movement direction in accordance with the further backward movement of the shaping unit 60 while the fifth powder material layer 65 is formed, the new powder material 5 is supplied at a predetermined layer thickness from the second powder material supply device 62 onto the top surface 2a of the table 2, more specifically, the fifth powder material layer 85.

Then, the binder liquid is ejected from the first binder liquid supply device 65 located adjacently subsequently after the second powder material supply device 62 to the new powder material 5 supplied onto the fifth powder material layer 85 while matching the shape of a sixth layer from the downside of the shaped object as the shaping target so as to bind the powder material.

Accordingly, a sixth powder material layer 86 including a sixth layer portion from the downside of the shaped object as the shaping target is formed.

Furthermore, the first powder material supply device 61 moves in the backward movement direction without supplying the powder material.

Figure 11C:
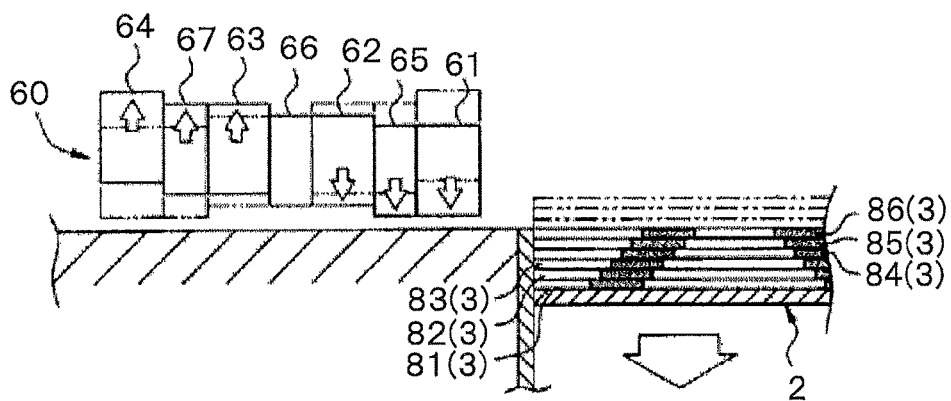

When the shaping unit 60 moves backward to the origin position, as illustrated in FIG. 11C, the top surface 2a of the table 2 is moved downward by the thickness of three powder material layers and the powder material supply devices 61 to 64 and the binder liquid supply devices 65 to 67 of the shaping unit 60 are moved upward and downward so that the shaping unit 60 is set to a forward movement mode again.

Subsequently, the shaping unit 60 in the forward movement mode is moved forward again and is moved while three new powder material layers are formed on the sixth powder material layer 86. Further, when the forward movement of the shaping unit 60 is completed, the top surface 2a of the table 2 is moved downward by the thickness of three powder material layers 3 and the shaping unit 60 is changed to a backward movement mode so as to move backward. Then, the shaping unit is moved while three new powder material layers are formed.

Subsequently, when the shaping unit 60 moves forward and backward, the shaping unit 60 is changed to a forward/backward movement mode, and the top surface 2a of the table 2 is moved downward by the thickness of three powder material layers 3. Then, three powder material layers 3 are sequentially formed and stacked by the shaping unit 60. Accordingly, the shaped object as the shaping target is completed.

The three-dimensional fabricating apparatus 1C with the above-described configuration basically can obtain the same effect as the first embodiment.

In addition, since the powder material layers 3 can be formed and stacked whenever the shaping unit 60 moves in a reciprocating manner (forward and backward), the meaningless movement of the shaping unit can be omitted compared to the configuration of the first embodiment in which the powder material layer is formed only by the forward movement of the shaping unit and the shaping unit returns to the origin position. Accordingly, there is an advantage that the shaping speed of the shaped object can be remarkably improved.

Further, in the case of the shaping unit 60 of the embodiment, three powder material layers can be formed when the shaping unit moves or backward once. For this reason, the powder material layer forming efficiency obtained when the shaping unit moves forward or backward once becomes high and the shaping speed of the shaped object becomes fast compared to the first embodiment in which two powder materials are formed when the shaping unit moves forward once.

FIGS. 12A to 12C illustrate a fourth embodiment of the three-dimensional fabricating apparatus of the invention. Here, a three-dimensional fabricating apparatus 1D of the embodiment is used to form the powder material layer when the powder material supply device and the binder liquid supply device move forward as in the second embodiment, but the structure for moving the powder material supply device and the binder liquid supply device is different from those of the second embodiment.

Specifically, in the three-dimensional fabricating apparatus 1D of the embodiment, a shaping unit 100 includes powder material supply devices 101 to 108 and binder liquid supply devices 111 to 118 provided as many as the powder material supply devices 101 to 108. In the embodiment, the powder material supply devices 101 to 108 and the binder liquid supply devices 111 to 118 are capable of sequentially forming the powder material layer 3 while moving forward from the origin position (the front side position of the table 2) in the backward and forward directions (a direction following the transversal direction of the top surface 2a of the table 2) of the three-dimensional fabricating apparatus 1D.

Further, the powder material supply devices 101 to 108 and the binder liquid supply devices 111 to 118 are respectively separated from one another and are movable independently.

In addition, the powder material supply devices 101 to 108 and the binder liquid supply devices 111 to 118 of the shaping unit 100 are all movable in the same direction and are adapted to move (as the forward movement in the case of the embodiment) in series while being adjacent to the top surface 2a of the table 2 when the powder material layer 3 is formed.

In addition, the shaping unit 100 has a configuration in which the powder material supply devices 101 to 108 and the binder liquid supply devices 111 to 118 are disposed alternately and linearly in the movement direction and the powder material supply device 101 is located at the foremost side in the movement direction (the forward movement direction) of the shaping unit 100.

Further, a group includes the powder material supply device 101 located at the foremost side in the forward movement direction and the binder liquid supply device located adjacently subsequently after the powder material supply device, and the binder liquid supply devices 111 to 118 of the same group move so as to follow the movement of the powder material supply devices 101 to 108. Then, each group can form the powder material layer 3 including a part of layers of the shaped object of the shaping target in a manner such that the powder material 5 is supplied onto the top surface 2a of the table 2 and the binder liquid is ejected to the powder material 5 supplied onto the top surface 2a of the table 2 in each group.

In addition, in the shaping unit 100, the supply position of the powder material 5 and the binder liquid ejection position of the group (specifically, a group including the powder material supply device 101 and the binder liquid supply device 111) located at the foremost position in the forward movement direction are set to be lowest among the groups each including the powder material supply device located at the front side in the forward movement direction and the binder liquid supply device located adjacently subsequently after the powder material supply device. Further, the powder material supply position and the binder liquid ejection position of the subsequent group of the powder material supply device and the binder liquid supply device increase by the thickness of one powder material layer 3 as it goes toward the rear side in the forward movement direction. Thus, the supply position of the powder material 5 and the binder liquid ejection position of the rearmost group (specifically, a group including the powder material supply device 108 and the binder liquid supply device 118) are set to be highest among all groups of the powder material supply device and the binder liquid supply device.

Accordingly, the groups of the powder material supply devices 101 to 108 and the binder liquid supply devices 111 to 118 can form the powder material layers 3 so that the powder material layers are displaced by one layer thickness. For this reason, when the front group forms the powder material layer 3 during the forward movement of the shaping unit 100, the group located adjacently subsequently after the front group sequentially forms a new powder material layer 3 on the powder material layer 3 formed by the front group with a slight time difference. In this way, the powder material layers can be formed and stacked sequentially.

As a result, the shaping unit 100 can form the powder material layers 3 in a stacked state while moving forward once.

Furthermore, in the case of the embodiment, since eight groups of the powder material supply device and the binder liquid supply device are formed, eight powder material layers can be formed and stacked when the group of the powder material supply device and the binder liquid supply device moves forward once.

Incidentally, in the shaping unit 100, when each of the powder material supply devices 101 to 108 and the binder liquid supply devices 111 to 118 moves forward so that the supply of the powder material onto each powder material layer ends or the ejection of the binder liquid ends, the powder material supply devices 101 to 108 in which the supply of the powder material ends or the binder liquid supply devices 111 to 118 in which the ejection of the binder liquid ends are separated from the top surface 2a of the table 2 from the adjacent state and are sequentially returned to the origin positions.

Further, when the powder material supply devices 101 to 108 and the binder liquid supply devices 111 to 118 are returned to the origin positions, the powder material supply devices 101 to 108 and the binder liquid supply devices 111 to 118 are returned to the origin positions while the original order in the forward movement direction is not changed, and are moved to the top surface 2a of the table 2 again so as to perform the supply of the powder material and the ejection of the binder liquid in original order.

In addition, even when the powder material supply devices 101 to 108 and the binder liquid supply devices 111 to 118 are returned to the origin positions, the powder material supply position or the binder liquid ejection position is maintained at the originally set height. Thus, when the powder material layer 3 is formed on the top surface 2a of the table 2, the powder material supply position and the binder liquid ejection position of the group located at the foremost position in the forward movement direction are lowest, and the subsequent groups of the powder material supply device and the binder liquid supply device are maintained so that the powder material supply position and the binder liquid ejection position increase in height by one layer thickness of the powder material layer as it goes toward the rear side in the forward movement direction.

In the embodiment, the powder material supply devices 101 to 108 and the binder liquid supply devices 111 to 118 are moved as below.

That is, when the powder material supply devices 101 to 108 or the binder liquid supply devices 111 to 118 reach the position of the movement end (in the case of the embodiment, the rear side of the table 2) after the supply of the powder material or the ejection of the binder liquid with respect to the powder material layer ends in accordance with the forward movement thereof, the powder material supply devices 101 to 108 or the binder liquid supply devices 101 to 108 are substantially moved upward in the vertical direction so as to be separated from the top surface 2a of the table 2 from the adjacent state. Further, the device is moved to a height not contacting the other powder material supply device or the other binder liquid supply device.

Subsequently, the device is horizontally and linearly moved backward in a direction toward the origin position and is moved downward at a position just above the origin position so as to be returned to the origin position.

Thus, as illustrated in FIGS. 11A to 11C, the powder material supply devices 101 to 108 and the binder liquid supply devices 111 to 118 are moved so as to depict a substantially rectangular shape in the side view. In this way, a series of operations are repeated in which the device moves forward from the origin position, moves upward after the supply of the powder material and the ejection of the binder liquid end, moves backward toward the origin position, moves downward to a position just above the origin position, and returns to the origin position.

Each of the powder material supply devices and the binder liquid supply devices is moved by a movement device individually moving each of the devices.

An arbitrary configuration can be used as long as the movement device linearly moves the powder material supply devices 101 to 108 and the binder liquid supply devices 111 to 118 while the devices are adjacent to the top surface of the table when forming the powder material layer, separates the devices from the top surface of the table from the adjacent state when the supply of the powder material onto one powder material layer ends, and sequentially returns the devices to the origin position.

For example, the movement device may include a pair of left and right guide rails 120 and 120 (here, only one guide rail is illustrated in FIGS. 12A to 12C) which are provided at both ends of the powder material supply devices 101 to 108 and the binder liquid supply devices 111 to 118 in the longitudinal direction and extend so as to follow the movement directions (a substantially rectangular shape in the side view) of the powder material supply devices 101 to 108 and the binder liquid supply devices 111 to 118 and a pair of left and right vehicle wheels which moves along the pair of guide rails provided at both ends of the powder material supply devices 101 to 108 and the binder liquid supply devices 111 to 118 in the longitudinal direction. Then, when one or both the pair of vehicle wheels are rotated by an electric motor so that the pair of vehicle wheels moves along the guide rails, the powder material supply devices 101 to 108 and the binder liquid supply devices 111 to 118 are moved so as to depict a substantially rectangular shape in the side view as described above.

Alternatively, a pulley may be provided instead of the vehicle wheel and a timing belt or a timing chain may be provided instead of the guide rail.

Furthermore, since the configurations of the powder material supply devices 101 to 108, the configurations of the binder liquid supply devices 111 to 118, and the configuration of the table 2 are basically similar to those of the first embodiment, the detailed description thereof will be omitted.

A method of fabricating the shaped object by using the three-dimensional fabricating apparatus 1D with the above-described configuration will be described.

When the shaped object as the shaping target is formed, the table 2 is moved upward to the upper end position inside the cylindrical member 12 as a preparation step similarly to the first embodiment. Further, as illustrated in FIG. 12A, the shaping unit 100 separates the powder material supply devices 101 to 108 and the binder liquid supply devices 111 to 118 from the top surface 2 of the table 2 so that the powder material supply device located at the foremost end position is located at the origin position.

Then, as illustrated in FIG. 12B, the powder material supply devices 101 to 108 and the binder liquid supply devices 111 to 118 of the shaping unit 100 are sequentially moved forward while being adjacent to the top surface 2a of the table 2 from the state where the devices are located at the front side in the forward movement direction.

At this time, the powder material layer is formed by the group including the powder material supply device located at the front side in the forward movement direction and the binder liquid supply device located adjacently and subsequently after the powder material supply device. Here, the group located at the foremost side in the forward movement direction forms the powder material layer 3 directly located below the top surface 2a of the table 2, and the subsequent groups sequentially form and stack new powder material layers 3 on the top surface 2a of the table 2, more specifically, on the powder material layer 3 formed by the adjacent front group.

In addition, as illustrated in FIG. 12C, the powder material supply device in which the supply of the powder material ends or the binder liquid supply device in which the ejection of the binder liquid ends reaches the movement end in accordance with the forward movement and moves upward sequentially in the substantially vertical direction so as to be separated from the top surface 2a of the table 2 in the adjacent state. Further, the device moves backward at a height not disturbing the forward movement of the other powder material supply device or the other binder liquid supply device and moves downward at a position above the origin position so as to return to the origin position.

Then, when the ejection of the binder liquid of the binder liquid supply device 118 located at the rearmost side in the shaping unit 100 ends, the powder material layer 3 is completely formed and stacked by an operation in which the shaping unit moves forward once. Accordingly, the table 2 is moved downward and the top surface of the powder material layer 3 formed by the rearmost group of the powder material supply device and the binder liquid supply device is located at the upper end inside the cylindrical member 12.

Subsequently, the powder material supply device 101 located at the foremost side of the shaping unit 100 returned to the origin position is moved forward again, and the new powder material is supplied onto the powder material layer 3 formed by the rearmost group of the powder material supply device 108 and the binder liquid supply device 118.

Subsequently, when a series of operations are repeated in which the groups of the powder material supply device and the binder liquid supply device of the shaping unit 100 sequentially move forward so as to form the powder material layers 3 and return to the origin position, eight powder material layers can be formed and stacked, and finally the shaped object as the shaping target is completed.

According to the three-dimensional fabricating apparatus 1D with the above-described configuration, the same effect as the first embodiment can be obtained basically.

However, since the powder material supply devices 101 to 108 and the binder liquid supply devices 111 to 118 of the shaping unit 100 sequentially start to return to the origin position when the supply of the powder material and the ejection of the binder liquid end, time can be saved to the full, compared to the case where the entire shaping unit moves to the origin position as in the first embodiment, that is, the shaping unit returns to the origin position after the supply of the powder material and the ejection of the binder liquid of the powder material supply device and the binder liquid supply device end. That is, in the case of the three-dimensional fabricating apparatus 1D of the embodiment, the powder material supply devices 101 to 108 and the binder liquid supply devices 111 to 118 sequentially start to return to the origin position immediately after the supply of the powder material and the ejection of the binder liquid end without waiting for the supply of the powder material and the ejection of the binder liquid of the powder material supply device and the binder liquid supply device. For this reason, it is possible to remarkably shorten the time necessary until the shaping unit moves forward at the next time. Accordingly, the shaping speed of the shaped object can be improved.

Figure 14:
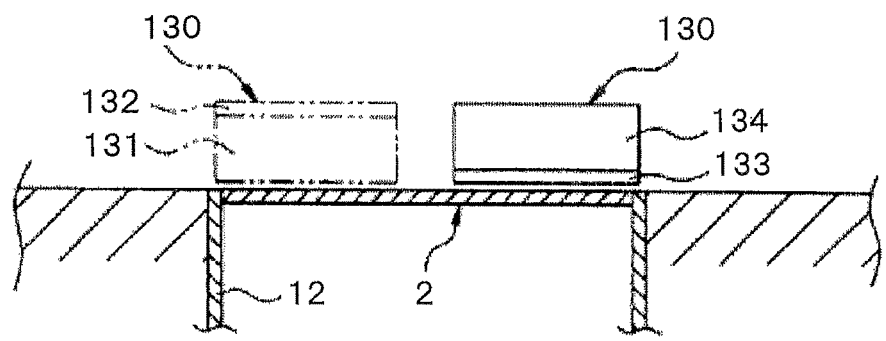
FIG. 14 is a longitudinal sectional view illustrating the three-dimensional fabricating apparatus when viewed from the front side thereof.

FIGS. 13 and 14 illustrate a fifth embodiment of the invention, and a three-dimensional fabricating apparatus 1E of the embodiment is different from the three-dimensional fabricating apparatus according to the first embodiment in the movement direction of the shaping unit.

That is, in the first embodiment, the shaping unit 4 moves linearly. However, in the fifth embodiment, as illustrated in FIG. 13, first and second powder material supply devices 131 and 132 and first and second binder liquid supply devices 133 and 134 of a shaping unit 130 are movable so as to rotate in the circumferential direction in a substantially rounded rectangular shape in the top view, and the powder material layer 3 is formed during the rotation in the circumferential direction of the powder material supply devices 131 and 132 and the binder liquid supply devices 133 and 134.

Specifically, in the embodiment, the shaping unit 130 having a configuration (the length in the longitudinal direction, the powder material supply width, and the binder liquid ejection width are about ⅔ of the size of the shaping unit of the first embodiment) substantially similar to the shaping unit of the first embodiment except for the length in the longitudinal direction, the powder material supply width, and the binder liquid ejection width is used.

Then, the shaping unit 130 is moved forward linearly and substantially in parallel to the transversal direction of the top surface 2a of the table 2 toward the rear side of the three-dimensional fabricating apparatus 1E so as to pass through the right half side of the top surface 2a of the table 2, and is moved forward linearly and substantially in parallel to the transversal direction of the top surface of the table toward the front side of the three-dimensional fabricating apparatus 1E so as to pass through the left half side of the top surface 2a of the table 2. At this time, the shaping unit 130 forms two powder material layers 3 and 3 when passing by each of the right half side and the left half side of the top surface 2a of the table 2, and hence can shape the shaped object at each of the right side and the left side of the top surface 2a of the table 2.

Further, the switching between the movement at the right half side and the left half side of the shaping unit 130 of the top surface 2a of the table 2 is performed at a position where the shaping unit 130 completely passes by the top surface 2a of the table 2 after the supply of the powder material and the ejection of the binder liquid with respect to the powder material layers 3 to be formed by the powder material supply devices 131 and 132 and the binder liquid supply devices 133 and 134 end. That is, the position is located at the front side of the top surface 2a of the table 2 and the rear side of the top surface 2a.

Then, when the shaping unit 130 is moved forward so as to depict a substantially semi-circular shape in the top view, the direction of the entire shaping unit 130 is switched so that the first powder material supply device 131 of the shaping unit 130 is located at the foremost side in the forward movement direction as the movement direction all the time. Accordingly, the switching of the movement of the shaping unit 130 at the right half side and the left half side of the top surface 2a of the table 2 is performed.

Thus, since the shaping unit 130 can rotate in the circumferential direction in a substantially rounded rectangular shape in the top view while the first powder material supply device 131 is located at the foremost position at all times, the shaping unit 130 can be moved forward continuously without stop.

Furthermore, the shaping unit 130 is adapted to rotate in the circumferential direction in a substantially rounded rectangular shape in the top view by a movement device (not illustrated) moving the entire shaping unit 130.

As the movement device, an arbitrary configuration can be used as long as the entire shaping unit can be moved stably in a substantially rounded rectangular shape in the top view.

For example, as for the circumferential rotation route of the shaping unit, a configuration may be employed in which a gear rotated by the rotation of an electric motor is provided at a portion located at the outer circumferential side of the route in the shaping unit, a rail having a tooth engaging with the gear is provided on the route of the portion located at the outer circumferential side of the shaping unit, and the shaping unit is self-rotated. At this time, it is desirable that a guide rail be provided at a position located at the inner circumferential side of the route of the shaping unit and the shaping unit be movable along the guide rail in a stable posture.

The three-dimensional fabricating apparatus 1E with the above-described configuration basically can obtain the same effect as the first embodiment. However, since the shaping unit 130 can be continuously moved forward, there is an advantage that the shaped object can be efficiently shaped while effectively using the movement time compared to the case where the shaping unit returns to the origin position as in the first embodiment.

Furthermore, in the cases illustrated in FIGS. 13 and 14, when the shaping unit 130 moves forward so as to rotate in the circumferential direction, an area in which the shaping unit 130 does not pass by the top surface 2a of the table 2 exists at the center of the top surface 2a of the table 2, and hence there is a place in which the shaped object cannot be shaped on the top surface 2a of the table 2.

Figure 15:
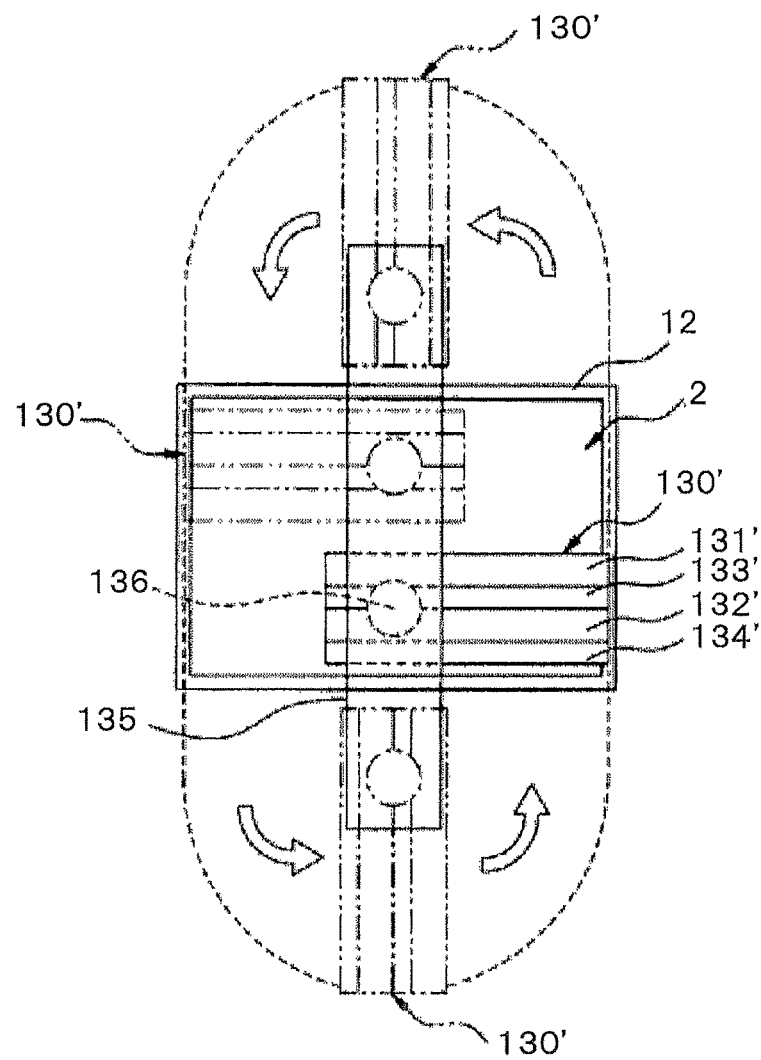
FIG. 15 is a cross-sectional view schematically illustrating a three-dimensional fabricating apparatus different from FIGS. 13 and 15, where a casing is omitted.
Figure 22:
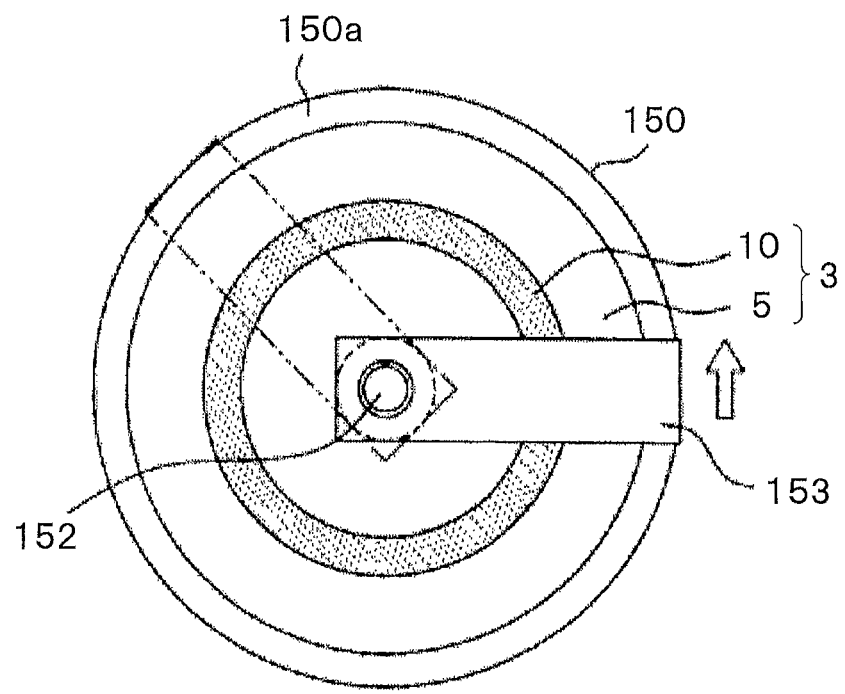
FIG. 22 is a top view illustrating a method of forming the three-dimensional shaped object in the three-dimensional fabricating apparatus according to the sixth embodiment of the invention.
Figure 23:
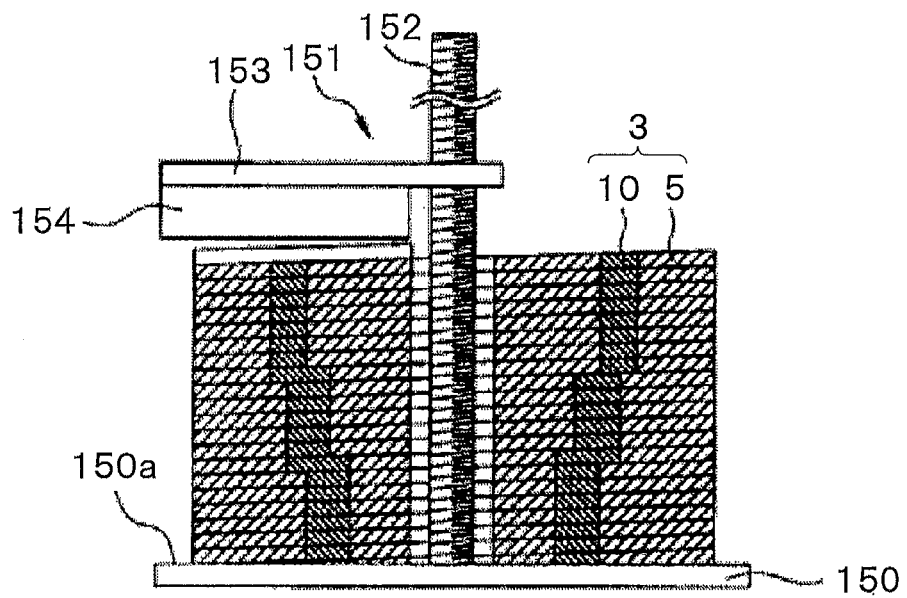
FIG. 23 is a cross-sectional view illustrating the same.

For that reason, for example, as illustrated in FIGS. 15 and 16, an area in which the shaped object is not shaped on the top surface 2a of the table 2 may exist.

Specifically, in the examples illustrated in FIGS. 15 and 16, the length of each of powder material supply devices 131' and 132' and binder liquid supply devices 133' and 134' in the longitudinal direction, the powder material supply width of each of the powder material supply devices 131' and 132', and the binder liquid ejection width of each of the binder liquid supply devices 133' and 134' of a shaping unit 130' are set to be equal to or larger than a half of the length of the edge of the rectangular shape of the top surface 2a of the table 2. Meanwhile, a portion in which the shaping unit 130' moves at the center side of the top surface 2a of the table 2 moves forward through the center portion of the top surface 2a of the table 2 in the longitudinal direction.

Further, the end portion of the shaping unit 130' moving at the center side of the top surface 2a of the table 2 passes through the center portion of the top surface 2a of the table 2 in the longitudinal direction, and is connected to a center rail 135 extending in the transversal direction of the top surface 2a of the table 2 so as to be movable and rotatable.

Then, the center rail 135 guides the movement of the shaping unit 130' so that the shaping unit 130' moves forward along the center of the top surface 2a of the table 2 in the longitudinal direction at all times.

Furthermore, for example, a configuration illustrated in FIG. 16 can be used in order to connect the shaping unit 130' and the center rail 135 to each other.

That is, the shaping unit 130' is provided with a connection member 136 having a substantially T-shaped cross-section and including a bar-shaped portion 136a formed upright and a flange portion 136b formed at the upper end side of the bar-shaped portion 136a so as to have a substantially disk shape in the top view.

Meanwhile, the center rail 135 includes a groove 135a which extends in the axial direction of the center rail 135 and is opened downward so that the flange portion 136b of the connection member 136 is stored therein so as to be movable and rotatable about the axis of the bar-shaped portion 136a and a pair of protrusions 135b and 135b which is provided in the end portions (the lower end portions) of the pair of groove walls of the groove 135a so as to protrude orthogonally toward the inside of the groove 135a and to prevent the separation of the flange portion 136b.

Accordingly, when a part of the flange portion 136b and the bar-shaped portion 136a of the connection member 136 of the shaping unit 130' is movably stored inside the groove 135 of the center rail 135, the shaping unit 130' is connected to the center rail 135. Further, the center rail 135 is capable of guiding the shaping unit 130' so that the shaping unit moves so as to pass through the center of the top surface 2a of the table 2 in the longitudinal direction.

Furthermore, FIGS. 17 to 23 illustrate a sixth embodiment of the three-dimensional fabricating apparatus of the invention. Here, in the first to fifth embodiments, the powder material layer is formed while the shaping unit moves linearly on the top surface of the table. However, the three-dimensional fabricating apparatus of the embodiment has a large difference in that the powder material layer is continuously formed and stacked while the shaping unit rotates on the top surface of the table in one direction.

That is, the three-dimensional fabricating apparatus 1F of the embodiment includes a single table 150 which forms and stacks the powder material forming the shaped object in a layered manner and a shaping unit 151 which forms the powder material layer 3 on the top surface 150a of the table 150.

The shaping unit 151 includes a shaft member 152 which extends in the vertical direction and a rotation member 153 which is provided in the shaft member 152 so as to be rotatable about the axis of the shaft member 152.

In addition, the rotation member 153 is provided with a single powder material supply device 154 which supplies the powder material 5 onto the top surface 150a of the table 150 by every predetermined layer thickness and two binder liquid supply devices 155 and 156 which eject the binder liquid to the powder material 5 supplied onto the top surface 150a of the table 150.

Then, when the rotation member 153 rotates about the axis of the shaft member 152, the powder material layer 3 is formed on the top surface 150a of the table 150 by the supply of the powder material and the ejection of the binder liquid while the powder material supply device 154 and the binder liquid supply devices 155 and 156 rotate about the axis of the shaft member 152 along with the rotation member 153.

Furthermore, in the embodiment, the table 150 is basically maintained at a uniform height without upward and downward movement until the shaped object is completely shaped during the formation of the powder material layer 3.

Since the rotation member 153 is formed in a substantially rectangular plate shape in the top view on the whole, a penetration hole 157 is formed so as to penetrate in the up and down direction one end side plate surface in the longitudinal direction and to cause the shaft member 152 to be inserted thereinto, and a screw groove is formed on the inner circumferential surface of the penetration hole 157 so as to engage with a screw ridge of the shaft member 152.

Since the shaft member 152 is formed in a bar shape having a substantially circular cross-section so that the lower end side is fixed to the top surface 2a of the table 2, the outer circumferential surface is provided with a screw ridge engaging with the screw groove of the penetration hole 157 of the rotation member 153.

Then, when the rotation member 153 rotates about the axis of the shaft member 152 in one direction, the rotation member 153 gradually moves upward by the pitch of the screw ridge and the screw groove. At this time, the pitch of the screw ridge and the screw groove is set so that the rotation member 153 moves upward by one powder material layer 3 when the rotation member 153 rotates about the shaft member 152 once.

Specifically, the rotation member 153 is rotated about the axis of the shaft member 152 by using the screw ridge and the screw groove of $z=b\theta$ (here, b indicates stacking pitch/$2\pi$ and z indicates a distance in the height direction).

Meanwhile, in the embodiment, the table is basically maintained at the uniform height without upward and downward movement until the shaped object is completely shaped during the formation of the powder material layer 3.

Furthermore, an arbitrary method can be used in order to rotate the rotation member 153.

For example, a method may be used which fixes a pulley to the rotation member 153 so that the pulley rotates about the rotation center of the penetration hole 157 and transmits a rotation force of an electric motor provided outside the shaping unit 151 to a timing belt or a timing chain so that the rotation member rotates about the axis of the shaft member. Further, the rotation member 153 may be rotated about the shaft member in a manner such that an electric motor is fixed to the rotation member 153 and a rotation force of the electric motor is transmitted to the shaft member 152 through a vehicle wheel provided in an output shaft of the electric motor. In these cases, in order to smoothly and stably rotate the rotation member 153, it is desirable to use a configuration in which a spiral guide rail having a pitch matching the upward movement degree in accordance with the rotation of the rotation member 153 is provided so as to surround the outer periphery of the table 150 and the rotation member moves on the guide rail by a linear guide having a columnar or spherical rolling element.

Alternatively, a configuration can be used in which a spiral guide rail having a pitch matching the upward movement degree in accordance with the rotation of the rotation member 153 is provided so as to surround the outer periphery of the table 150 and a vehicle wheel traveling on the guide rail is provided at the end portion opposite to the penetration hole 157 in the rotation member 153. Then, the rotation member 153 may be moved upward while being rotated about the axis of the shaft member 152 when the vehicle wheel is rotated by the electric motor so that the rotation member 153 moves along the guide rail. At this time, it is desirable to use a linear guide including a columnar or spherical rolling element between the guide rail and the rotation member 153 in order to smoothly rotate the rotation member 153.

Further, the powder material supply device 154 is provided at the front side of the rotation member 153 in the rotation direction during the formation of the powder material layer 3, and has a powder material supply width from the vicinity of the penetration hole 157 in the rotation member 153 to the opposite end to the end provided with the penetration hole 157.

Here, the powder material supply device 154 basically has the same configuration as the first embodiment, but the shape of the outlet 154a discharging the powder material toward the top surface 150a of the table 150 is different. As illustrated in FIG. 19, a shape is formed in which the opening area of the outlet 154a increases as it moves close to the end portion located at the outer circumferential side during the rotation of the rotation member 153.

The reason why the outlet 154a has such a shape is as below. That is, the circumferential speed of the end portion located at the outer peripheral side is higher than that of the inner peripheral side during the rotation of the rotation member 153. For this reason, when the same powder material as the inner peripheral side is discharged, the discharge amount is not sufficient, and hence the powder material formed on the top surface 150a of the table 150 does not have a uniform layer thickness.

For that reason, a shape is formed in which the opening area of the outlet increases as it goes toward the end portion located at the outer peripheral side during the rotation of the rotation member 153, and hence the powder material discharge amount increases as it goes toward the end portion located at the outer peripheral side during the rotation. Accordingly, the powder material is supplied onto the top surface 150a of the table 150 so as to have a uniform layer thickness.

Furthermore, since the other configuration of the powder material supply device 154 is similar to that of the first embodiment, the detailed description thereof will be omitted.

In addition, two binder liquid supply devices 155 and 156 are provided subsequently after the powder material supply device 154 and are rotated along with the powder material supply device 154 during the rotation of the rotation member 153.

Among the binder liquid supply devices 155 and 156, the first binder liquid supply device 155 is provided at the end portion in the transversal direction opposite to the powder material supply device 154 in the rotation member 153, and the second binder liquid supply device 156 is provided at a position between the first binder liquid supply device 155 and the powder material supply device 154.

The first binder liquid supply device 155 has the same binder liquid ejection width as the powder material supply width of the powder material supply device 154.

Meanwhile, the second binder liquid supply device 156 is used to assist the first binder liquid supply device 155, and rotates along with the powder material supply device 154 and the first binder liquid supply device 155 during the rotation so that the binder liquid is ejected in synchronization with the first binder liquid supply device 155.

The ejection width of the second binder liquid supply device 156 is smaller than the binder liquid ejection width of the first binder liquid supply device 155, and is about a half of the binder liquid ejection width of the first binder liquid supply device 155 in the case illustrated in FIG. 19. Further, the second binder liquid supply device 156 is provided at a position near the end portion as the outer peripheral side of the rotation member 153 during the rotation of the rotation member 153.

In this way, the reason why the second binder liquid supply device 156 is provided is as below. That is, since the circumferential speed of the end portion located at the outer peripheral side is higher than that of the inner peripheral side during the rotation of the rotation member 153, the binder liquid ejection amount at the outer peripheral side is not sufficient only in the first binder liquid supply device 155. Thus, there is a possibility that the powder material may not be appropriately bound. For that reason, it is possible to stably bind the powder material by sufficiently ensuring the amount of the binder liquid ejected from the end portion located at the outer peripheral side during the rotation of the rotation member 153 by the ejection of the binder liquid from the second binder liquid supply device 156.

Furthermore, the second binder liquid supply device 156 and the first binder liquid supply device 155 basically have the same configuration except for the binder liquid ejection width. Further, since the basic configurations of the first and second binder liquid supply devices are similar to those of the first embodiment, the detailed description thereof will be omitted.

A method of fabricating the shaped object by using the three-dimensional fabricating apparatus 1F with the above-described configuration will be described.

When the shaped object as the shaping target is formed, the rotation member 153 is moved downward to a height capable of forming the lowermost layer of the shaped object on the top surface 150a of the table 150 as a preparation step. At this time, the powder material is charged into the powder material supply device 154 of the shaping unit 151, and the binder liquid is charged into each of the binder liquid supply devices 155 and 156.

Then, the rotation member 153 of the shaping unit 151 is rotated about the axis of the shaft member 152 in one direction (a direction in which the powder material supply device 154 is located at the foremost position), and the powder material 5 is supplied at a predetermined layer thickness from the powder material supply device 154 onto the top surface 150a of the table 150 during the rotation.

Then, the binder liquid is ejected from the first binder liquid supply device 155 and the second binder liquid supply device 156 located adjacently subsequently after the powder material supply device 154 to the powder material 5 supplied onto the top surface 150a of the table 150 so as to match the shape of the lowermost layer of the shaped object as the shaping target and to bind the powder material.

Here, as illustrated in FIGS. 20 to 23, the powder material supply device 154 and the first and second binder liquid supply devices 155 and 156 continuously supply the powder material 5 and eject the binder liquid during the rotation of the rotation member 153 so as to continuously form the powder material layer 3 including layers of a part of the shaped object as the shaping target.

At this time, since the rotation member 153 gradually moves upward while continuously rotating about the axis of the shaft member 152, the powder material layer 3 is automatically stacked whenever the powder material supply device 154 and the first and second binder liquid supply devices 155 and 156 rotate once when the powder material layer 3 is continuously formed while the powder material supply device 154 and the first and second binder liquid supply devices 155 and 156 rotate.

Thus, since the rotation member 153 is continuously rotated until the shaped object of the shaping target is completely shaped, the powder material supply device 154 and the first and second binder liquid supply devices 155 and 156 continuously form and stack the powder material layers 3, and finally the shaped object is completed.

In this way, according to the three-dimensional fabricating apparatus 1F with the above-described configuration, the powder material layer 3 can be continuously formed and stacked while the powder material supply device 154 and the first and second binder liquid supply devices 155 and 156 are rotated about the axis of the shaft member 152 by the rotation member 153. For this reason, the powder material supply device 154 and the binder liquid supply devices 155 and 156 do not move meaninglessly. Accordingly, the shaped object as the shaping target can be extremely efficiently shaped in a short time in accordance with the shape.

In addition, since the powder material layer can be continuously formed and stacked only when the rotation member 154 is moved upward while being rotated about the axis of the shaft member 152, the shaped object can be shaped only by the control in the height direction. Thus, there is an advantage that the entire apparatus is easily controlled.

Furthermore, in the cases illustrated in FIGS. 17 to 23, when the rotation member 153 rotates about the axis of the shaft member 152, since the lower end side of the shaft member 152 is fixed to the top surface 150a of the table 150, a place is formed in which the supply of the powder material of the powder material supply device 154 and the ejection of the binder liquid of the binder liquid supply devices 155 and 156 cannot be performed so that the shaped object is not shaped on the top surface 150a of the table 150. Further, in this case, since there is an area in which the shaping operation cannot be performed, there is a possibility that the shape of the shaped object as the shaping target may be restricted.

For that reason, for example, as illustrated in FIGS. 24 and 25, an area in which the shaped object is not shaped on the top surface 150a of the table 150 may not exist.

Specifically, in the examples illustrated in FIGS. 24 and 25, since a rotation member 153' of a shaping unit 150' is fixed to the lower end side of a shaft member 152' and the shaft member 152' is rotated about the axis along with the rotation member 153', the entire rotation member 153' is rotated about the axis of the shaft member 152' and the shaft member 152' is gradually moved upward in accordance with the rotation. The reference numeral 158 of FIGS. 23 and 24 indicates a support member that rotatably supports the shaft member 152'. Here, the support member 158 is provided with a penetration hole 158a into which the shaft member 152' is inserted, and the inside of the penetration hole 158a is provided with a screw groove engaging with a screw ridge formed on the outer circumferential surface of the shaft member. Thus, when the shaft member 152' rotates about the axis, the shaft member moves upward inside the penetration hole of the support member 158 and consequently the rotation member 153' also moves upward.

Further, since the powder material supply width of the powder material supply device 154 and the binder liquid ejection width of the first binder liquid supply device 154 are set to be equal to the length of the rotation member in the longitudinal direction, the supply of the powder material and the ejection of the binder liquid can be performed on the entire area of the top surface 150a of the table 150.

Accordingly, since an area is formed in which the powder material supply device 154 and the binder liquid supply devices 155 and 156 cannot perform the supply of the powder material and the ejection of the binder liquid, the shaped object can be shaped on the entire top surface 150a of the table 150, and hence the limitation in the shape of the shaped object as the shaping target is remarkably small.

Furthermore, in this case, the shaft member 152' gradually moves upward by the rotation of the shaft member 152' so that the rotation member 153' moves upward. Accordingly, the powder material layers are stacked. However, the top surface of the table may be gradually moved downward while the height of the shaft member is uniform, that is, the height of each of the powder material supply devices and the binder liquid supply devices provided in the rotation member is uniform.

In the first to fifth embodiments, two powder material supply devices and two binder liquid supply devices are used. However, at least one powder material supply device and at least one binder liquid supply device may be provided as long as the binder liquid supply device moves so as to follow the movement of the powder material sharing device.

Further, the number of the powder material supply devices and the binder liquid supply devices in use can be arbitrarily set in accordance with the size of the entire three-dimensional fabricating apparatus or the size of the shaped object as the shaping target.

Further, in the first to fifth embodiments, the powder material layers are stacked while the top surface of the table is basically moved downward. However, the powder material layers may be sequentially formed and stacked while the powder material supply devices and the binder liquid supply devices are respectively moved upward in response to the number of the stacked powder material layers without moving the top surface of the table upward and downward during the shaping operation of the shaped object.

In the third embodiment, in the shaping unit 60, the plurality of powder material supply devices 61 to 64 and the plurality of binder liquid supply devices 65 to 67 are alternately and linearly disposed in the movement direction, and the powder material supply devices 61 and 64 are located at both end sides in the movement direction. Accordingly, the powder material layer is formed during the reciprocating operation of the shaping unit, that is, both forward and backward movement operations of the shaping unit.

However, in the configuration of forming the powder material layer during both forward and backward movement operations of the shaping unit, the powder material supply devices and the binder liquid supply devices do not need to be disposed in this order, and the powder material supply devices and the binder liquid supply devices may be alternately and linearly disposed.

For example, as illustrated in FIGS. 26 and 27, a shaping unit 170 may have a configuration in which first to third powder material supply devices 171 to 173 and first to third binder liquid supply devices 174 to 176 are disposed alternately and linearly. In this case, three powder material supply devices and three binder liquid supply devices may be alternately and linearly disposed. Further, the powder material supply devices 171 to 173 and the binder liquid supply devices 174 to 176 can be moved upward and downward so as to be changed to a mode suitable for forming the plurality of powder material layers 3 in the movement directions as the forward movement direction and the backward movement direction of the shaping unit 170.

Furthermore, in FIGS. 26 and 27, since the basic configurations of the first to third powder material supply devices 171 to 173 and the first to third binder liquid supply devices 174 to 176, the configurations of the elevation devices moving the powder material supply device and the binder liquid supply device upward and downward, and the configuration of the table are basically similar to those of the third embodiment, the detailed description thereof will be omitted.

However, in the cases illustrated in FIGS. 26 and 27, the shaping unit 170 has a configuration in which the binder liquid supply device is disposed at one end side and the powder material supply device is disposed at the other end side in the arrangement direction of the powder material supply device and the binder liquid supply device, and the binder liquid supply device and the powder material supply device are left at both end sides in the movement direction of the shaping unit.

At that time, there is no need to stop the formation of the powder material layer in the entire shaping unit 170. Then, the binder liquid supply device and the powder material supply device left at both ends may be moved along with the movement of the shaping unit 170 without the ejection of the binder liquid or the supply of the powder material.

Specifically, as illustrated in FIG. 27A, when the shaping unit 170 moves forward, three the powder material layers 3 can be formed by all powder material supply devices 171 to 173 and all binder liquid supply devices 174 to 176.

However, as illustrated in FIG. 27B, when the shaping unit 170 is changed to a backward movement mode during the backward movement of the shaping unit 170, the third binder liquid supply device 176 located at the foremost position in the movement direction and the first powder material supply device 171 located at the rearmost position are left.

Thus, when the third binder liquid supply device 176 and the first powder material supply device 171 are not used to form the powder material layers 3, are moved upward to a height not disturbing the formation of the powder material layer 5, and then is moved (moved backward), the powder material layer can be continuously formed in the entire shaping unit 170, and hence the shaped object can be efficiently shaped. Further, in this case, the shaping unit 170 moves backward while forming two powder material layers 3.

Furthermore, in the configuration of the shaping unit in which the plurality of powder material supply devices and the plurality of binder liquid supply devices are alternately and linearly disposed in the movement direction and the powder material layer is formed during both forward and backward movement operations of the shaping unit, there is also a case in which the binder liquid supply device is located at both end sides of the movement direction. Even in this case, the binder liquid supply device located at the foremost position in the movement direction during the forward or backward movement of the shaping unit may be moved without ejecting the binder liquid.

In the sixth embodiment, one powder material supply device and two binder liquid supply devices are substantially used. However, the number of the powder material supply devices and the binder liquid supply devices can be arbitrarily selected in accordance with the size of the entire three-dimensional fabricating apparatus or the size of the shaped object as the shaping target.

Further, in the sixth embodiment, one rotation member 153 is provided with the powder material supply device 154 and the binder liquid supply devices 155 and 156. However, when the powder material layers can be appropriately formed and stacked while the binder liquid supply device follows the movement of the powder material supply device, the powder material supply device and the binder liquid supply device may be respectively provided in different rotation members.

In addition, in the sixth embodiment, when the rotation member 153 provided with the powder material supply device 154 and the binder liquid supply devices 155 and 156 is rotated about the axis of the shaft member, the powder material layers are continuously formed one by one.

However, a configuration may be employed in which a plurality of rotation members provided with the powder material supply device and the binder liquid supply device is used and the rotation members are rotated about the axis of the shaft member while a predetermined angle therebetween is maintained so that a plurality of powder material layers is continuously formed. At this time, it is important that the rotation members form the powder material layers while moving upward by the number of the powder material layers formed by all rotation members by every rotation.

REFERENCE SIGNS LIST 1A to 1F: three-dimensional fabricating apparatus
2, 150: table
2a, 150a: top surface (of table)
3: powder material layer
4, 30, 60, 100, 130, 130', 151, 170: shaping unit
5: powder material
6, 7, 31, 32, 61 to 64, 101 to 108, 131, 131', 132, 132', 154, 171 to 173: powder material supply device
8, 9, 33, 34, 65 to 67, 111 to 118, 132, 132', 133, 133', 134, 134', 155, 156, 174 to 176: binder liquid supply device
10: layer of part of three-dimensional shaped object
15, 16, 35, 36, 71 to 73, 75 to 77: pair including powder material supply device and binder liquid supply device
152: shaft member
153: rotation member

The invention claimed is:
1. A three-dimensional fabricating apparatus comprising:
a table on which a powder material is stacked in a layered manner; and
a shaping unit which includes
  a powder material supply device supplying the powder material onto a top surface of the table by every predetermined layer thickness, and
  a binder liquid supply device ejecting a binder liquid to the powder material supplied onto the top surface of the table so as to bind the powder material,
wherein the powder material supply device of the shaping unit is movable in one direction in a state adjacent to the top surface of the table and is configured to supply the powder material onto the top surface of the table at a predetermined supply width while moving the powder material supply device,
wherein the binder liquid supply device is configured to:
  move in the same direction as the powder material supply device in a state adjacent to the top surface of the table,
  eject the binder liquid to the top surface of the table at the same ejection width as the powder material supply width of the powder material supply device in maximum, and
  move and eject the binder liquid to the powder material supplied onto the top surface of the table in accordance with the movement of the powder material supply device, and
wherein the shaping unit includes a rotation member that is rotatable about an axis of a shaft member extending in the vertical direction,
wherein the rotation member is provided with the powder material supply device and the binder liquid supply device, and
wherein, when the powder material supply device and the binder liquid supply device rotate about the axis of the shaft member along with the rotation member, the powder material layer is formed on the top surface of the table.

2. The three-dimensional fabricating apparatus according to claim 1, wherein the binder liquid supply device includes an inkjet head which extends horizontally in a direction intersecting the movement direction of the binder liquid supply device and ejects the binder liquid toward the powder material supplied onto the top surface of the table.

3. The three-dimensional fabricating apparatus according to claim 1, wherein the lower end side of the shaft member is fixed to the top surface of the table, and wherein, when the rotation member rotates about the axis of the shaft member in one direction, the rotation member rotates along with the powder material supply device and the binder liquid supply device.

4. The three-dimensional fabricating apparatus according to claim 3, wherein the rotation member is fixed to the lower end side of the shaft member, and wherein the rotation member gradually and synchronously moves upward while rotating along with the rotation of the shaft member.

5. A three-dimensional shaped object shaping method of fabricating a shaped object while stacking a powder material layer by sequentially repeating a step of supplying a powder material from a powder material supply device onto a top surface of a table which is used to stack the powder material in a layered manner at a predetermined layer thickness and a step of ejecting a binder liquid from a binder liquid supply device to the powder material supplied onto the top surface of the table so that the powder material is bound and layers of a part of a three-dimensional shaped object of a shaping target are formed, wherein the powder material supply device is moved in one direction while being adjacent to the top surface of the table so that the powder material is supplied onto the top surface of the table at a predetermined supply width, wherein the powder material layer is formed in a manner such that the binder liquid supply device is moved in the same direction as the powder material supply device in a state adjacent to the top surface of the table so as to follow the movement of the powder material supply device and the binder liquid is ejected to the powder material supplied onto the top surface of the table at the same ejection width as the powder material supply width of the powder material supply device in maximum, wherein the powder material supply device and the binder liquid supply device are provided in a rotation member being rotatable about an axis of a shaft member extending in the vertical direction, and wherein the powder material supply device and the binder liquid supply device rotate about the axis of the shaft member along with the rotation member while forming the powder material layer on the top surface of the table.

6. The three-dimensional shaped object fabricating method according to claim 5, wherein, when the rotation member continuously rotates about the axis of the shaft member and gradually moves upward along with the powder material supply device and the binder liquid supply device, the powder material supply device and the binder liquid supply device continuously stack the powder material layer while continuously forming the powder material layer.

7. The three-dimensional shaped object fabricating method according to claim 5, wherein, when the powder material is supplied from the powder material supply device at a predetermined layer thickness onto the top surface of the table, an additive is mixed with the powder material before the powder material is supplied onto the top surface of the table.

* * * * *